United States Patent [19]

Nasar et al.

[11] Patent Number: 5,144,685
[45] Date of Patent: Sep. 1, 1992

[54] LANDMARK RECOGNITION FOR AUTONOMOUS MOBILE ROBOTS

[75] Inventors: Hatem N. Nasar, Edina; Bir Bhanu, New Brighton, both of Minn.

[73] Assignee: Honeywell Inc., Minneapolis, Minn.

[21] Appl. No.: 331,710

[22] Filed: Mar. 31, 1989

[51] Int. Cl.$^5$ ............................................. G06K 9/20
[52] U.S. Cl. ..................................... 382/48; 358/103; 382/14; 382/15; 395/81; 395/88
[58] Field of Search ................. 382/10, 14, 15, 48, 382/9; 358/105, 103; 901/1, 8, 46, 47; 369/516; 395/80, 81, 88

[56] References Cited

U.S. PATENT DOCUMENTS

| | | | |
|---|---|---|---|
| 4,628,453 | 12/1986 | Kamejima et al. | 358/103 |
| 4,845,610 | 4/1989 | Parvin | 364/516 |
| 4,862,047 | 8/1989 | Suzuki et al. | 358/103 |
| 4,970,653 | 11/1990 | Kenue | 358/103 |
| 4,985,847 | 1/1991 | Shioya et al. | 358/103 |

OTHER PUBLICATIONS

"Automatic Target Recognition: State of the Art Survey" by Bir Bhanu, published in IEEE Transactions on Aerospace and Electronics Systems, Jul. 1986.
"Intelligent Target Recognizers," by H. Nasr, W. Au, and S. Mader, in Scientific Honeyweller, Summer 1988.
"Machine Vision for the Battlefield," by B. Bhanu, in Scientific Honeywell, Summer 1988.
"Triple: A Multi-Strategy Maching Learning Approach to Target Recognition," by B. Bhanu and J. Ming, in Image Understanding Workshop, Apr. 6–8, 1988.
"Dynamic Model Matching for Target Recognition from a Mobile Platform," by H. Nasr and B. Bhanu, in Image Understanding Workshop, Apr. 6–8, 1988.
"Qualitative Motion Detection and Tracking of Targets from a Mobile Platform," by B. Bhanu and W. Burger, in Image Understanding Workshop, Apr. 6–8, 1988.
"Qualitative Reasoning and Modeling for Robust Target Tracking and Recognition from a Mobile Platform," by B. Bhanu and D. Panda, in Image Understanding Workshop, Apr. 6–8, 1988.
"Drive-Dynamic Reasoning from Integrated Visual Evidence," by B. Bhanu and W. Burger, in Image Understanding Workshop, Feb. 23–25, 1987.
"Interpretation of Terrain Using Hierarchical Symbolic Grouping for Multi-Spectral Images," by B. Bhanu and P. Symosek in Image Understanding Workshop, in Feb. 23–25, 1987.
"Guiding an Autonomous Land Vehicle Using Knowledge-Based Landmark Recognition," by H. Nasr. B. Bhanu and S. Schaffer, in Image Understanding Workshop, Feb. 23–25, 1987.
"Honeywell Progress on Knowledge-Based Robust Target Recognition & Tracking," by B. Bhanu, D. Panda and R. Aggarwal, in Image Understanding Workshop, Feb. 23–25, 1987.

*Primary Examiner*—Joseph Mancuso
*Attorney, Agent, or Firm*—John G. Shudy, Jr.

[57] ABSTRACT

A dynamic model matching for landmark recognition wherein the model generation and matching process changes as a function of range to the landmark and of perspective as sensed from a mobile platform.

8 Claims, 17 Drawing Sheets

```
(DEFSCHEMA SITE-110
    (SITE            110)
    (LOCATION        (392961.7      1050742.9))
    (INSTANCE-OF     SITE)
    (STATUS          ACTIVE)
    (VIEW            FRONT)
    (HAS-LANDMARKS   (T-POLE-110 G-TANK-110 BLDG-110))
    (NEXT-SITE       (E 109  0.255)  (W 111  0.153))
    (SPACIAL-MODEL   SM-110)
    (TERRAIN-TYPE    NIL))

(SETQ    SM-110        ((T-POLE-110    G-TANK-110    BLDG-110)
                        (T-POLE-110            (LEFT-OF ROAD)
                                               (MIN-L-DIST-ROAD 160)
                                               (MAX-L-DIST-ROAD 200)

(G-TANK-110            (RIGHT-OF ROAD
                                               (MIN-R-DIST    200)
                                               (MAX-R-DIST    250))

(BLDG-110              (ABOVE    G-TANK-110)
                                               (RIGHT-OF     ROAD)
                                               (MIN-R-DIST   230)
                                               (MAX-R-DIST   280))))
```

*Fig. 4a*
(Prior Art)

```
(DEFSCHEMA S1
    •
    •
    •
    (NEXT SITE    (E S3 D1)
                  (W S2 D2)
                  (S S0 D3)
    •
    •
    •)
```

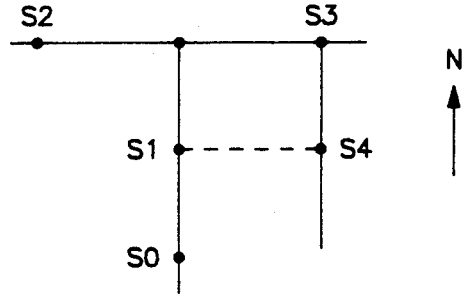

*Fig. 4b*
(Prior Art)

| | FEATURES | | | | | | | RECOGNITION RESULTS | |
|---|---|---|---|---|---|---|---|---|---|
| REGION | SIZE | COLOR | MBR | TEXTURE | ELONGATION | SHAPE | LOCATION | MATCH-EVIDENCE | LANDMARK HYPOTHESIS |
| 30 | SMALL(91) | BLACK(25.3) | (99,103,61,111) | SMOOTH | HIGH(50:4) | LONG AND LINEAR | (101.2,82.9) | 0.83 | T-POLE-110 |
| 79 | SMALL(104) | BLACK(27.3) | (104,105,112,132) | IRREGULAR | HIGH(20:1) | LONG AND LINEAR | (104.6,121.9) | 0.92 | T-POLE-110 |
| 95 | MEDIUM(675) | WHITE(224.5) | (445,510,140,155) | SMOOTH | LOW(05:15) | NOT CONVEX | (482,148.3) | 0.62 | G-TANK-110 |
| 71 | MEDIUM(672) | GRAY(199.7) | (469,510,99,127) | IRREGULAR | LOW(41:28) | LINEAR | (490.2,115.3) | 0.71 | BLDG-110 |

*Fig. 7*
*(Prior Art)*

LANDMARK RECOGNITION FOR AUTONOMOUS MOBILE ROBOTS

FIELD OF INVENTION

The present invention pertains to imaging and particularly to three-dimensional interpretation of two-dimensional image sequences. More particularly, the invention pertains to detection and recognition of landmarks.

BACKGROUND OF THE INVENTION

Visual information plays a key role in mobile robot operation. Even with the use of sophisticated inertial navigation systems, the accumulation of position error necessitates the need for periodic corrections. In the autonomous mobile robot application scenario, a significant amount of positional error is accumulated in the land navigation system after traversing long distances. Landmark recognition may be used to update the land navigation system through the recognition of observed objects in a scene and associating them with specific landmarks in the geographic map knowledge base, thus guiding the robot or vehicle having the navigation system, to stay on course. Landmarks of interest include mostly man-made objects such as telephone poles, storage tanks, buildings, houses, gates, bridges, roads, and the like.

SUMMARY OF THE INVENTION

An approach for landmark recognition based on the perception, reasoning, action, and expectation (PREACTE) paradign is presented for the navigation of autonomous mobile robots. PREACTE uses expectations to predict the appearance and disappearance of objects, thereby reducing computational complexity and locational uncertainty. It uses a concept called dynamic model matching (DMM), which is based on the automatic generation of landmark description at different ranges and aspect angles and uses explicit knowledge about maps and landmarks. Map information is used to generate an expected site model (ESM) for search delimitation, given the location and velocity of the mobile robot. The landmark recognition system generates 2-D and 3-D scene models from the observed scene. The 3-D models of landmarks at a particular map site are stored in heterogeneous representations. Using the 3-D models, the vision system generates multiple 2-D scene models as a function of estimated range and azimuth angle. The ESM hypotheses are dynamically verified by matching them to the abstracted image model. The matching problem is solved by using grouping of segments (lines and regions) and spatial reasoning. Positive as well as negative evidences are used to verify the existence of each landmark in the scene. The system also provides feedback control to the low-level processes to permit parameters adaptation of the feature detection algorithms to changing illumination and environmental conditions.

PREACTE emphasizes model-based vision which has been a popular paradigm in computer vision since it reduces computational complexity and no learning is involved. As mentioned in the above , in the DMM concept object/landmark descriptions are generated dynamically based on different ranges and view angles. The descriptions are a collection of spatial, feature, geometric and semantic models. From a given (or approximated) range and view angle, using a priori map information , 3-D landmark models, and the camera model, PREACTE generates predictions about the individual landmark location in the 2-D image. The parameters of all the models are a function of range and view angle. As the robot approaches the expected landmark, the image content change, which in turn requires updating the search and match strategies. Landmark recognition in this framework is divided into three stages—detection, recognition and verification. At farther ranges, "detection" of distinguishing landmark features is possible whereas at closer ranges, recognition and verification are more feasible, where more details of objects are observable.

BRIEF DESCRIPTION OF THE DRAWINGS

FIGS. 4a and 4b show definitions of site schema indicating the present and next sites.

FIG. 6b is an initial segmentation of the image in FIG. 6a.

FIG. 7 is a table of landmark recognition results.

FIG. 11 shows a hardware implementation of

DESCRIPTION OF THE PREFERRED EMBODIMENT

In the following, details of PREACTE and DMM concepts and results on real images taken by a robot or autonomous land vehicle are described. The task of visual landmark recognition in the autonomous mobile robot scenario can be categorized as uninformed and informed. In the uninformed case, given a map representation, the vision system attempts to attach specific landmark labels to image objects of an arbitrarily observed scene and infers the location o the vehicle in the map (world). Typically in this case, spatial or topological information about the observed objects is used to infer their identity and the location of the robot in the map. On the other hand, in the informed case, while the task is the same as before, there is a priori knowledge (with a certain level of certainty) of the robot's past location on the map and its velocity. It is the informed case that is of primary importance.

Figure 1:
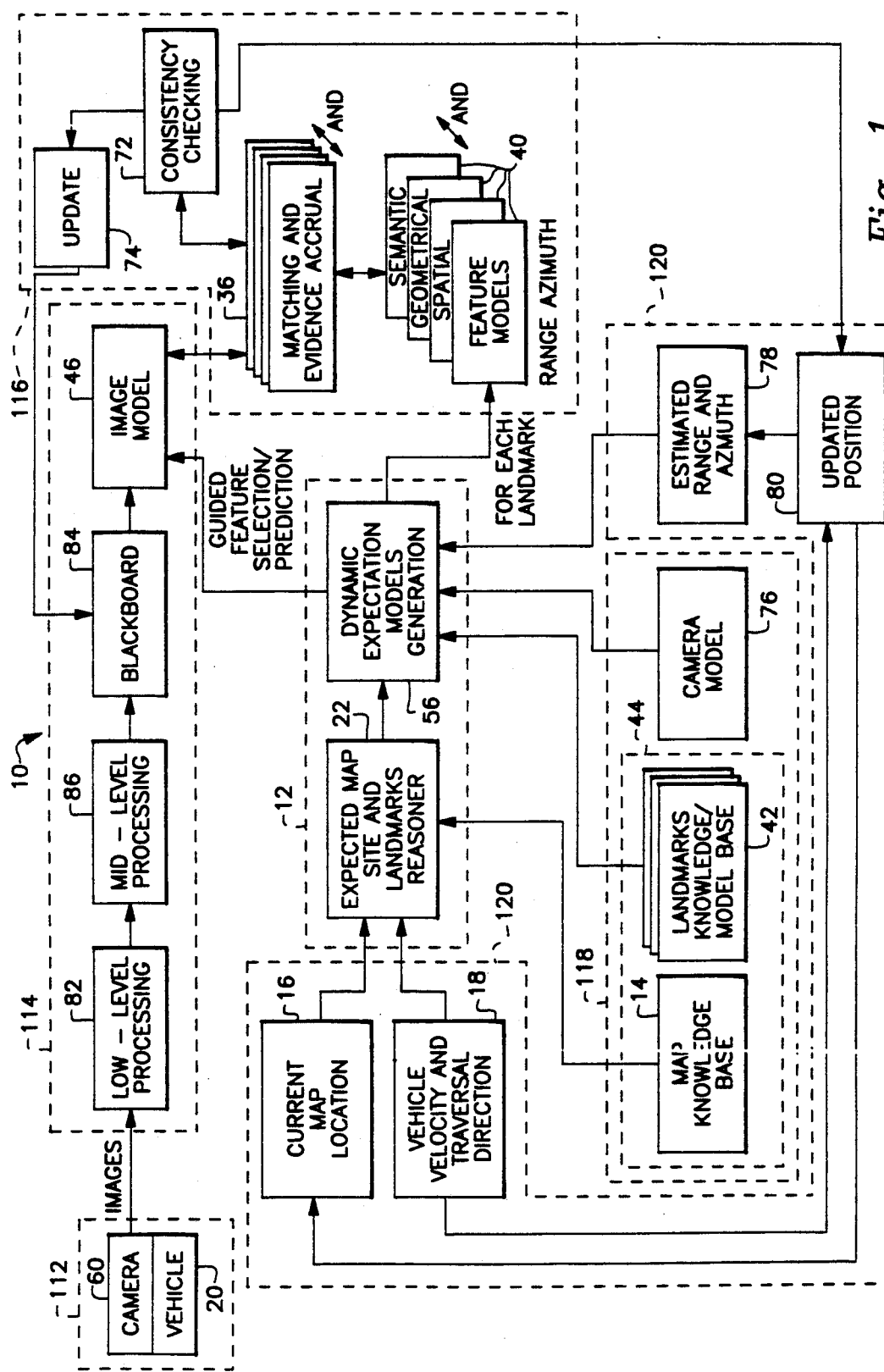
FIG. 1 is a block diagram of a landmark recognition system.

FIG. 1 illustrates PREACTE's landmark recognition system 10. Overall, system 10 comprises sensing means 112, first processing means 114, second processing means 12, third processing means 116, a first database 118 and a second database 120. It is a top-down expectation-driven arrangement 10, whereby an "expected site model" (ESM) 12 of a map is generated based on extensive domain-dependent knowledge of the current (or projected) location of robot 20 in the map and its velocity from location unit 16 and velocity unit 18. Also, ESM 12 generates models from map knowledge base 14 and landmarks knowledge base 42 in knowledge data base 44. ESM 12 contains models of the expected map site and landmarks in unit 22. ESM 12 provides hypotheses or expectations to be verified by a sequence of images to be acquired at a predicted time t, given the velocity of the robot 20 and the distance between the current site and the predicted one. Camera model 76 provides camera 60 parameter information to model generator 56 of ESM 12. Parameters include angle, height, pan, tilt, field of view, etc. of camera 60.

Figure 3:
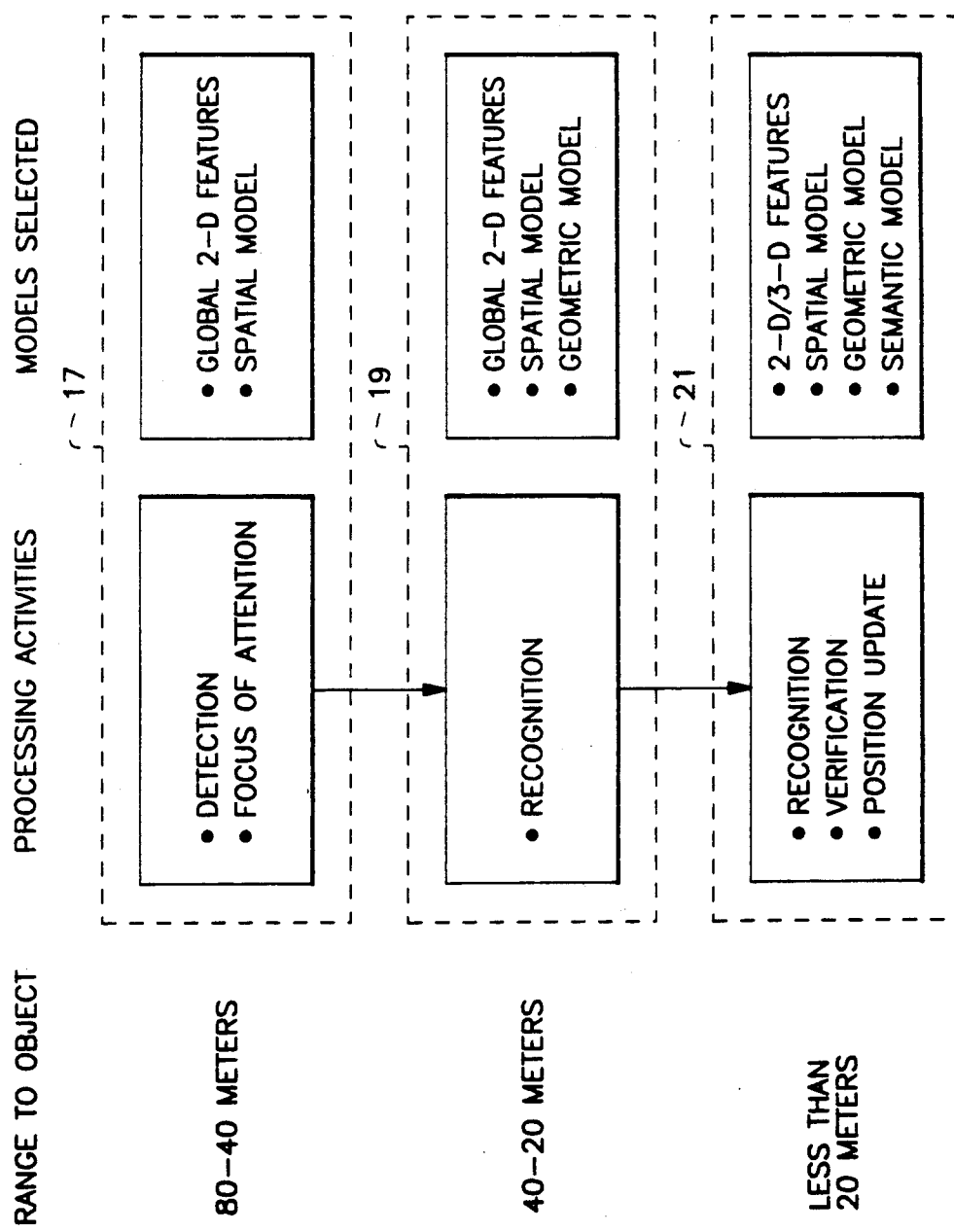
FIG. 3 notes a selection process of models.

FIG. 3 shows a graphic illustration of PREACTE's landmark recognition and map/landmark representation system 10. As shown, map site models 31, 32 and 33 introduce spatial constraints on the locations and distributions of landmarks, using a "road" 34 model as a reference. Spatial constraints greatly reduce the search space while attempting to find a correspondence between the image regions and an image model of unit 46. This mapping is usually many-to-one in complex outdoor scenes, because of imperfect segmentation.

ESM 12 is dynamic in the sense that the expectations and descriptions 52 and 54 of different landmarks 48 and 50 are based on different ranges and view angles. Multiple and hybrid landmark models from knowledge base 44 are used to generate landmark descriptions 52 and 54 as robot 20 approaches landmark 48 or 50, leading to multiple model/image matching steps by dynamic model matching (DMM) 36. Landmarks descriptions 52 and 54 are based on spatial, feature geometric and semantic models 40. There are two types of expectations which are range-dependent and range-independent. Range-dependent expectations are landmark features such as size, length, width, volume, etc. Range-independent expectations include color, perimeter squared over area, length over width, shape, etc. Range-independent expectations permit landmarks to utilize different strategies and plans for detection and recognition at various ranges. For example, building 50 has the distinctive color feature, that can be used to cue the landmark recognition process and to reduce the search space. Telephone pole 48, on the other hand, requires the emphasis of length/width feature.

Model selection and switching in the dynamic model matching process is dependent upon a range estimate to landmarks or objects (i.e., the range estimate is from unit 78) based on the position of robot 20 in the map (from unit 16), and landmark recognition accuracy obtained using matching results of unit 36. FIG. 3 shows how landmarks or object models are initially selected based on the estimated range from unit 78 of FIG. 1. The estimated range depends on the previous robot location at a landmark site from unit 16, velocity and traversal direction of robot 20 from unit 18, and a map data base 14 of the general area which includes portions of landmarks or objects.

Once robot 20 is within the detection range of 80-40 meters, global feature model of landmarks based on color and height-to-width ratio are selected. This is detection activity. Robot 20 focuses its attention in the area of image where the landmarks are expected. Image segmentation is accomplished, features are computed and then matching is performed. This process results in a matching confidence which in turn provides information about map site uncertainty. These values, along with the difference between the estimate and the actual size of the constituent parts of the landmark in the image, are used to decide whether landmark recognition system 10 should keep using the same models or switch to the next category of models—global 2-D features, spatial model and geometric model (40 to 20 meter range)—which is recognition activity 19. Likewise, when the range is less than 20 meters, semantic models are also used in verification activity 21 and the position update is accomplished. Thus, as robot 20 approaches a next range category 19 or 21 from 17 or 19, respectively, new processing activities are performed, based on the types of models.

Figure 2:
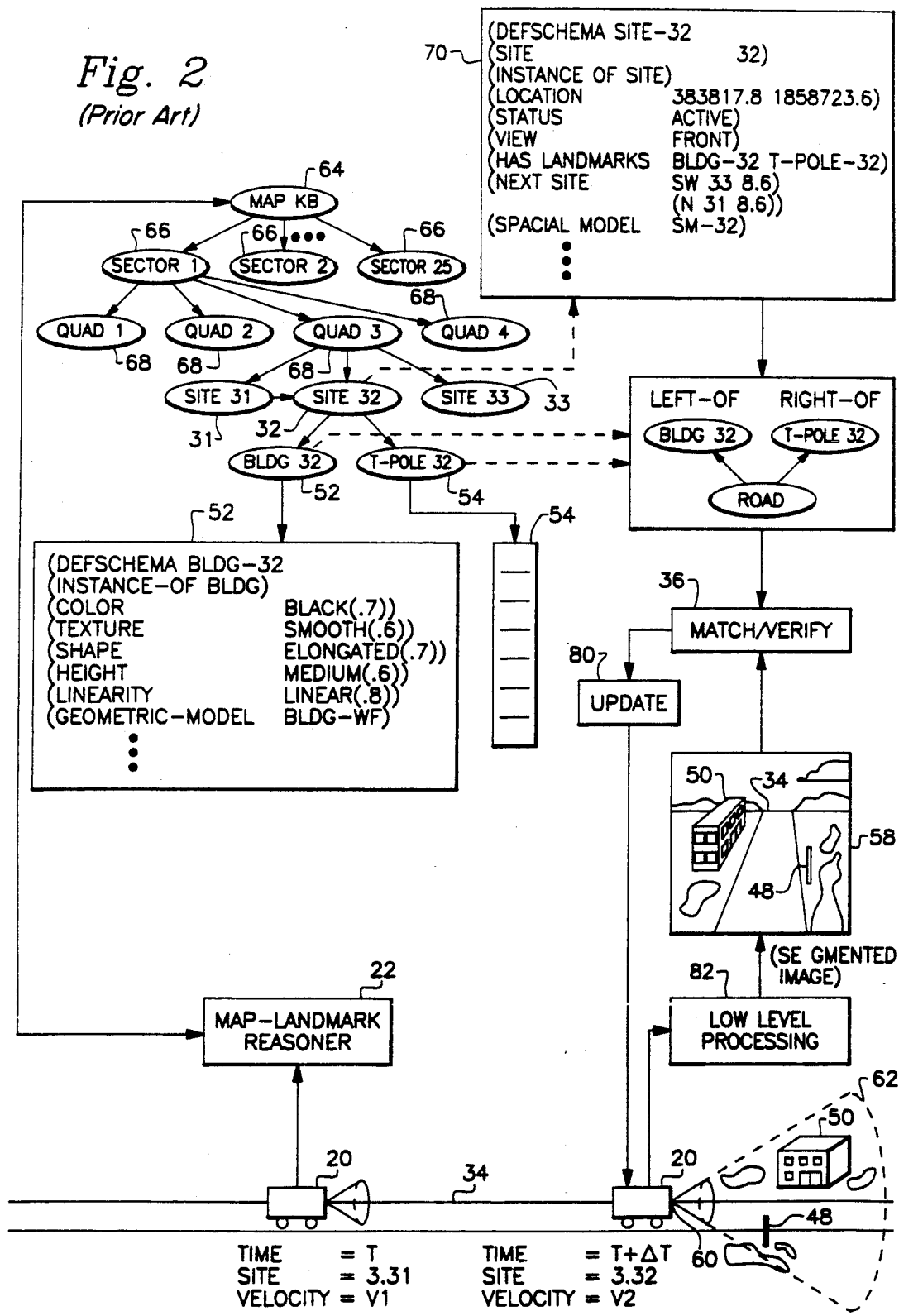
FIG. 2 is a functional chart of the landmark recognition system.

In PREACTE system 10 of FIG. 2, given an image 58 from camera 60 having a field of view 62, of robot 20, landmark recognition basically consists of a series of steps by respective units: unit 56 generates 2-D descriptions 52 and 54 from 3-D models of knowledge base 42 for each landmark 52 and 54 expected in image 58; unit 56 finds the focus of attention areas (FOAA) in the 2-D image 40 for each expected landmark 48 or 50; unit 40 generates the recognition plan to search for each landmark 48 and 50 which includes what features will be used for each landmark in a given map site; unit 56 generates the ESM 12 output at the given range and aspect angle; unit 36 searches for regions in the FOAA of the segmented image 58 that best match the features in the model; unit 36 searches for lines in the FOAA in the line image that best match the lines generated from the 3-D geometric model (this step is performed at close ranges where details can be observed); unit 36 matches expected landmarks features with regions attributes and computes evidences for all landmarks; unit 72 corrects the approximated range by using the size differences of the suspected landmark in the current and previous frames; and units 72 and 74 compute the uncertainty about the map site location.

In the segmented image 58, features such as size, texture, color, etc. of each region provide independent evidence for the existence of an expected landmark. Evidence accrual by unit 36 is accomplished by an extension of a heuristic Bayesian formula, which is discussed below. The heuristic formula is used to compute the certainty about a map site location based on the certainty of the previous site and the evidences of the existence of each landmark at the current site.

Extensive map knowledge 14 and landmarks models 42 in knowledge base 44 ar fundamental to the recognition task. Map representation of unit 14 relies heavily on declarative and explicit knowledge instead of procedural methods on relational databases of each sector 66. Map 64 is represented as quadtree 68 which in turn is represented in a hierarchical relational network. All map primitives are represented in a schema structure 70. The map dimensions are characterized by their cartographic coordinates. Schema representation 70 provides an object-oriented computational environment which supports the inheritance of properties by different map primitives and allows modular and flexible means for searching map knowledge base 14. The map sites between which robot 20 traverses have been surveyed and characterized by site numbers such as 31, 32 and 33. A large data base of information is available about these sites. (See FIGS. 2 and 4). This includes approximate latitude, longitude, elevation, distance between sites, terrain descriptions, landmarks labels contained in a site, etc. Such site information is represented in a SITE schema, with corresponding slots. Slots names include: HAS_LANDMARKS, NEXT_SITE, LOCATION, etc.

Figure 5:
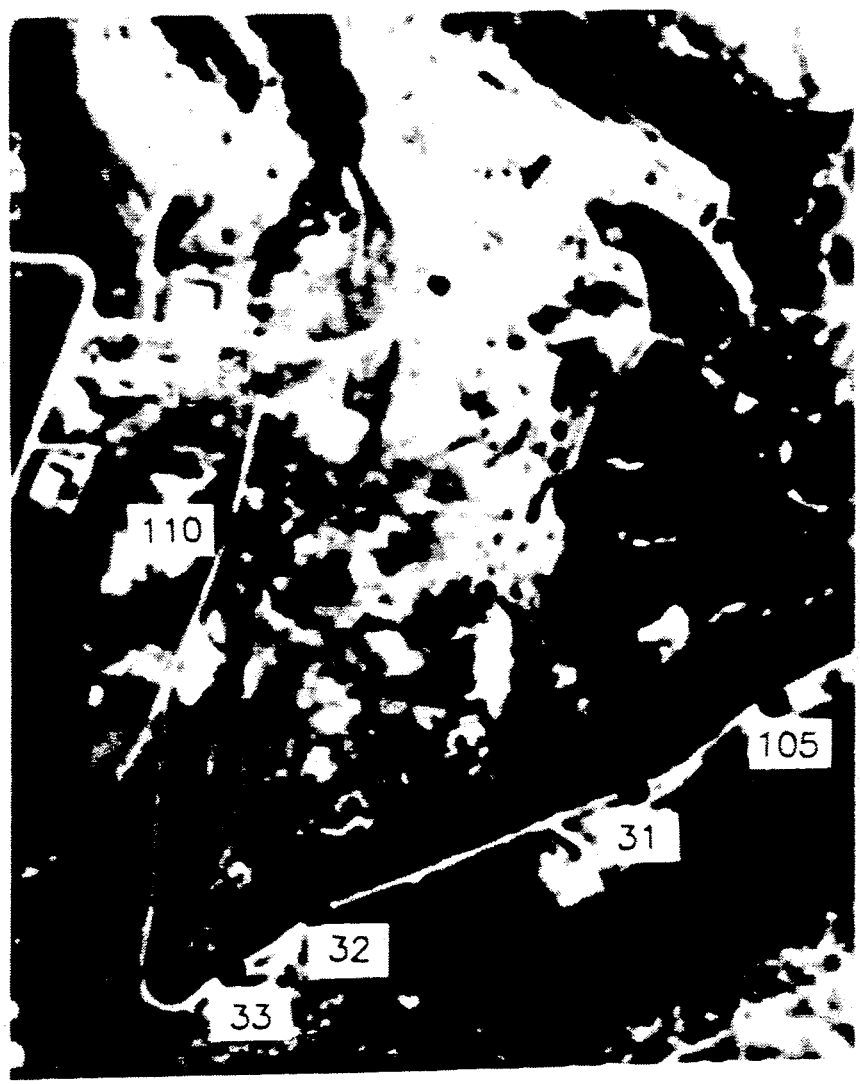
FIG. 5 is an aerial photograph of the sites' locations.

The map knowledge is represented in a hierarchical relational network, as illustrated in FIG. 2. The entire map 64 is divided into 25 sectors 66 (5 horizontally and 5 vertically). Each sector 66 contains four quadrants 68 which in turn contain a number of surveyed sites 31-33. All map primitives are represented in a schema structure 70. The map dimensions are characterized by their cartographic coordinates. Schema representation 70 provides an object-oriented computational environment which supports the inheritance of different map primitives properties and allows modular and flexible means for searching the map knowledge base 14. The map sites between which the vehicle traverses have been surveyed and characterized by site numbers, for example, 31, 32 and 33. An aerial photograph with numbered sites is shown in FIG. 5. A large data base of information is available about these sites. This includes: approximate latitude, longitude, elevation, distance between sites, terrain descriptions, landmarks labels contained in a site, etc. Such site information is represented in a SITE schema 32, with corresponding slots, as illustrated in FIG. 4a for site 110. Slots names include: HAS_LANDMARKS, NEXT_SITE, LOCATION, SPATIAL_MODEL, etc. A critical slot is NEXT_SITE which has an "active" value. By active, it is meant, that it is dependent on a variable (demon) which is the vehicle direction (North, South, etc.). For different names of the neighboring sites 31 and 33 are similarly shown in the NEXT_SITE slot, as shown in FIG. 4b. The SPATIAL_MODEL defines the "expectation zone" of the landmarks (in the image) with respect to the road and with respect to the others. It also specifies the minimum and maximum distance of each landmark from the road borderline. Each landmark is represented as a schema or a collection of schemas. Each landmark is represented as an instance of a landmark-class which, in turn, is an instance of an object-class. For example, POLE-17 is an instance of POLE, which is an instance of MAN_MADE_OBJECTS. Instances in this case inherit some properties and declare others.

Declarative representation of the knowledge allows not only a natural conceptual mapping, but also a flexible means for pattern matching, data access, tracing of the reasoning process and maintenance of the knowledge base In schema 52 of FIG. 2, the slots and their values in a LANDMARK schema correspond to the landmark's attributes such as color, texture, shape, geometric model, etc. The landmark attributes are characterized symbolically, such as color is "black", texture is "smooth", and shape is "elongated". Each attribute's value is assigned a likelihood that characterizes its discriminant strength. For example, the fact that poles are elongated, place a high likelihood value (e.g., 0.8) on having an elongated shape. The knowledge acquisition for modeling each landmark in the knowledge base is performed by abstracting and characterizing map data through actual observations and measurements, and observations of images taken at individual sites. The ground truth values of each landmark attribute are obtained from a combination of actual metrics, and approximations of features extracted from hand segmented images. Three dimensional geometric models are represented in the geometric-model slot of a LANDMARK schema 52. Different modeling techniques are available for different landmarks. For example, buildings are represented as wire-frames, while poles are represented as generalized cylinders. Thus, models are allowed to have heterogeneous representations. Image description is obtained by projecting the 3-D model on a 2-D plane using perspective transformations. This hybrid representational framework for object modeling provides a unique ability to combine different types o object descriptions (semantic, geometric and relational). This in turn allows the system to perform more robustly and efficiently.

Each map site that contains landmarks of interest has an explicitly stored spatial model, which describes in 3-D the location of the landmarks relative to the road and with respect to each other. By using a detailed camera model 76 (FIG. 1), range and azimuth angle, from unit 78 2-D views of the landmarks can be generated by unit 56. Estimated range and azimuth generator 78 receives current information pertinent to range and azimuth of robot 20, from updated position unit 80. The updated position information is a synthesis of velocity and traversal direction information from unit 18 and consistency information from unit 72 to unit 80.

Given a priori knowledge of the robot's current location in the map space and its velocity, it is possible to predict the upcoming site that will be traversed through the explicit representation of the map knowledge and proper control procedures. ESM 12 also contains information about the predicted (x,y) location of a given landmark and its associated focus of attention area (FOAA). The FOAA of a given landmark is an expanded area around the predicted location of the object. Map/landmark reasoner (MLR) 22 provides such control, by invoking the active values in the NEXT_SITE slot of the current SITE schema, as described earlier. ESM 12 is a "provision" by the MLR 22 to make the expected site and its corresponding landmark schemas as an "active" hypothesis to be verified. In parallel to predicting the next site, the distance between the current and the expected site along with the vehicle velocity are used to predict the (arrival) time at which the sequence of images should be processed to verify the hypothesized ESM output. Evidence accrual and knowledge aggregation is dynamically performed between sites to confirm arrival time at the predicted site. ESM 12 output for SITE-110 shown in FIGS. 4, 5, 6a, 6b and 6c.

Figure 6A:
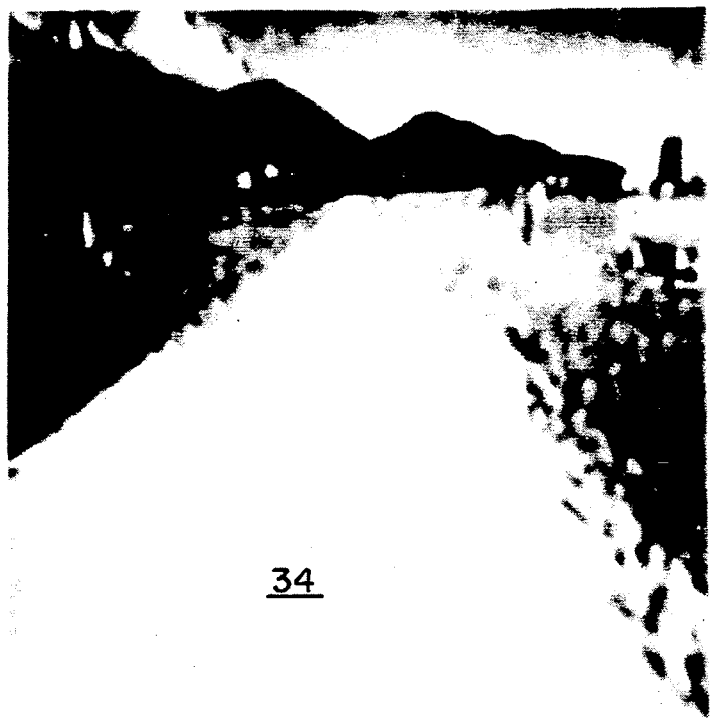
FIG. 6a is a photograph of an acquired image.
Figure 6B:
Figure 6C:
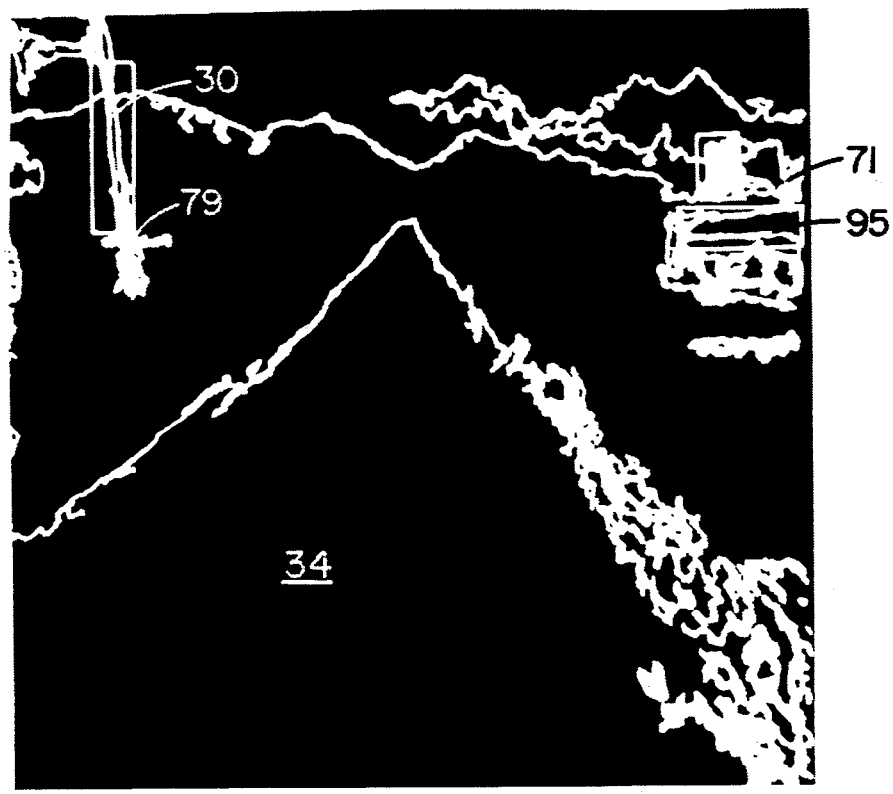
FIG. 6c is the segmented image of FIG. 6b after region splitting, merging and discarding of small regions.

Predictions are also used by the low-level image processing unit 82. A priori knowledge of the objects' attributes which will appear in the image and their relative locations guide the segmentation. The initial segmentation results are shown in FIG. 6b. FIG. 6c illustrates the segmented image after region splitting, merging and discarding small regions. The regions, highlighted by rectangles in FIG. 6c, indicate the results of landmark recognition by PREACTE. A rule-based system is invoked to interpret the corresponding information in the ESM 12 (FIG. 1), which results in properly adapting the segmentation parameters based on the landmarks' distinguishing attributes such as color, location, texture, etc.

FIG. 7 is a tabulation revealing the landmark recognition results. FIG. 7 contains a listing of the regions 30, 71, 79 and 95 for site 110 of FIG. 5, which are listed in FIG. 4, yielding the highest evidences and a subset of their features (other features that include compactness, intensity variance, etc.), as represented in the image model of unit 46. The spatial constraint specified by the spatial model yielded to a small number of regions-of-interest for the POLE hypothesis. More regions-of-interest were considered as candidates for the other landmarks. The road (region 34 in FIG. 6c) in the image is modeled by its approximate left border ($y = -0.8x + 357.0$) and it right border ($y = 1.3x - 126.7$) as geometrically illustrated in FIG. 8. The T-POLE-110 hypothesis produced two regions with high evidences. Since a threshold of 0.8 was used, both regions 30 and 79 are recognized as T-POLE-110. The lower part of the pole (region 79) is merged with some ground and background regions; nevertheless, it still resulted in a higher evidence than the upper part (region 30). The lower part of the tank was broken up into six small regions because of the illumination and shape factors. These regions were included in the hypothesis verification and they produced significantly lower evidences.

Image model 46 (FIG. 1) is where results of the system are observed. Image model 46, for the task of landmark recognition, has a collection of regions-of-interest extracted by a region-based segmentation method. A region-of-interest for this task is constrained by an upper and lower bound on its size. This means that after performing some region splitting and merging, most of the very small and the very large regions are merged or discarded from the image. In addition, regions-of-interest do not include any regions that represent moving objects in the scene as determined by the motion analysis module. Following image segmentation, a number of image features are extracted for each region, such as color, length, size, perimeter, texture, minimum bounding rectangle (MBR), etc., as well as some derived features such as elongation, linearity, compactness, etc. All image information is stored on and available in blackboard 84, which is a superset model of all the results collected from different image understanding modules. The landmark recognition system operates as a "knowledge source". There are other knowledge sources with other tasks such as object recognition (other than landmarks) and motion analysis. Images coming through low-level processing unit 82 are bridged over to blackboard 84 via mid-level processing unit 86. Blackboard 84 plays the role of a central knowledge structure among these different knowledge sources. During the process of extracting regions-of-interest for landmark recognition there is a risk of ignoring regions in the image that are part of the actual landmarks. These regions could have been split to very small regions or merged with very large ones, which is a natural outcome of the inherently weak segmentation methods. Symbolic feature extraction is performed on the region-based features. The symbolic characterization of the features using "relative" image information provides a better abstraction of the image and a framework for knowledge-based reasoning.

Each set of region features is represented in a schema structure instead of a feature vector as in pattern recognition. This schema representation of regions does not have any conceptual justifications; however, it provides a compatible data structure with the landmark models in knowledge base 44. Most of the region features have representative attributes in the landmarks models. This allows symbolic pattern matching to be performed easily. Beyond that, it makes the reasoning process more traceable.

Figure 8:
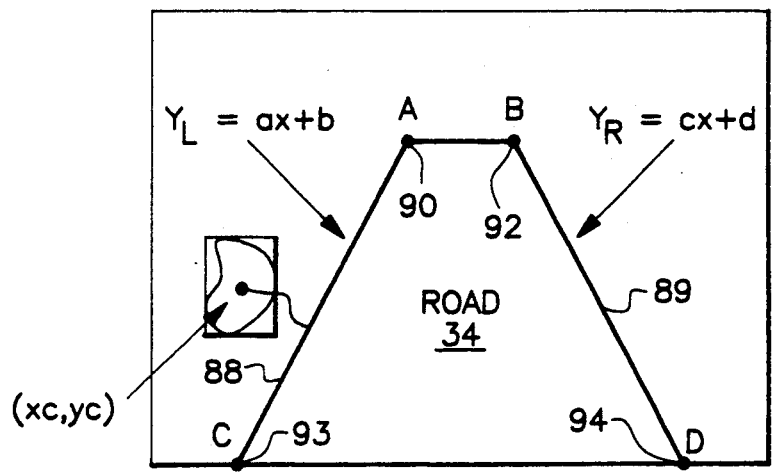
FIG. 8 is a geometric description of a road.
Figure 9:
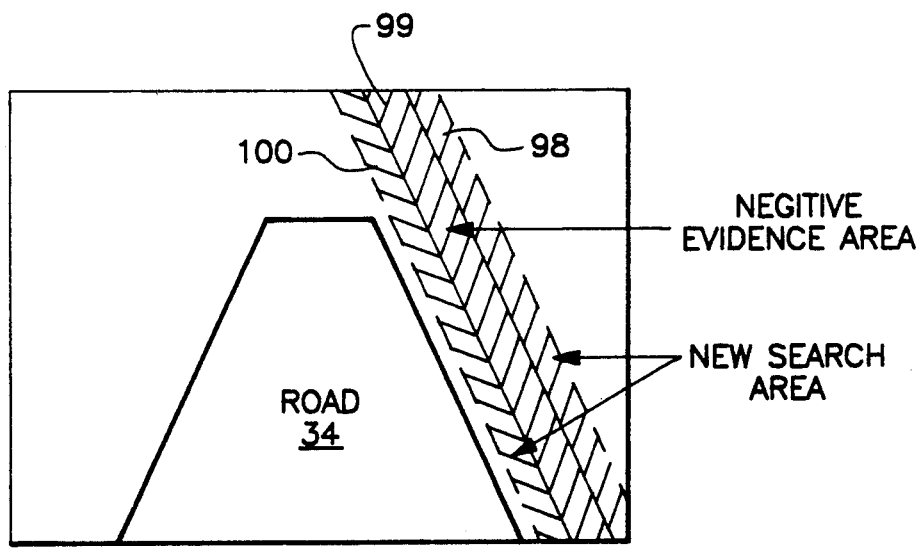
FIG. 9 shows regions of several evidence areas.

A critical region in image 58 is the road region 34, which is used as a reference in image model 46 (FIG. 1), in FIGS. 8 and 9. Spatial computation is performed on the regions-of-interest to find which regions in the image fall to the left and to the right of the road 34. Road 34 is segmented out in using the segmentation technique described above. This is assuming that it is a "structured" road (i.e., asphalt, concrete, etc.) that provides good contrast (not dirt roads). Road 34 is represented in the model by its vertices 90, 92, 93 and 94, and the approximate straight lines 88 and 89 of the left and right borders, as shown in FIG. 8. For each region, the position of its centroid ($x_c$, $y_c$) is determined and the shortest distance from the region to the road border line is computed. This distance is compared to the constraint imposed on each landmark by the site spatial model. Thus we obtain the following top-level structure for the image model:

$$(<IM-\#> \ <\text{frame-}\#> \ <\text{road-region-tag}>$$

$$<\text{number-of-regions-of-interest}>$$

$$((<\text{road-vertices}>)(<\text{left-border}>)(<\text{right-border}>)$$

$$((<\text{left-regions-list}>)((\text{right-regions-list}>))))$$

Figure 10:
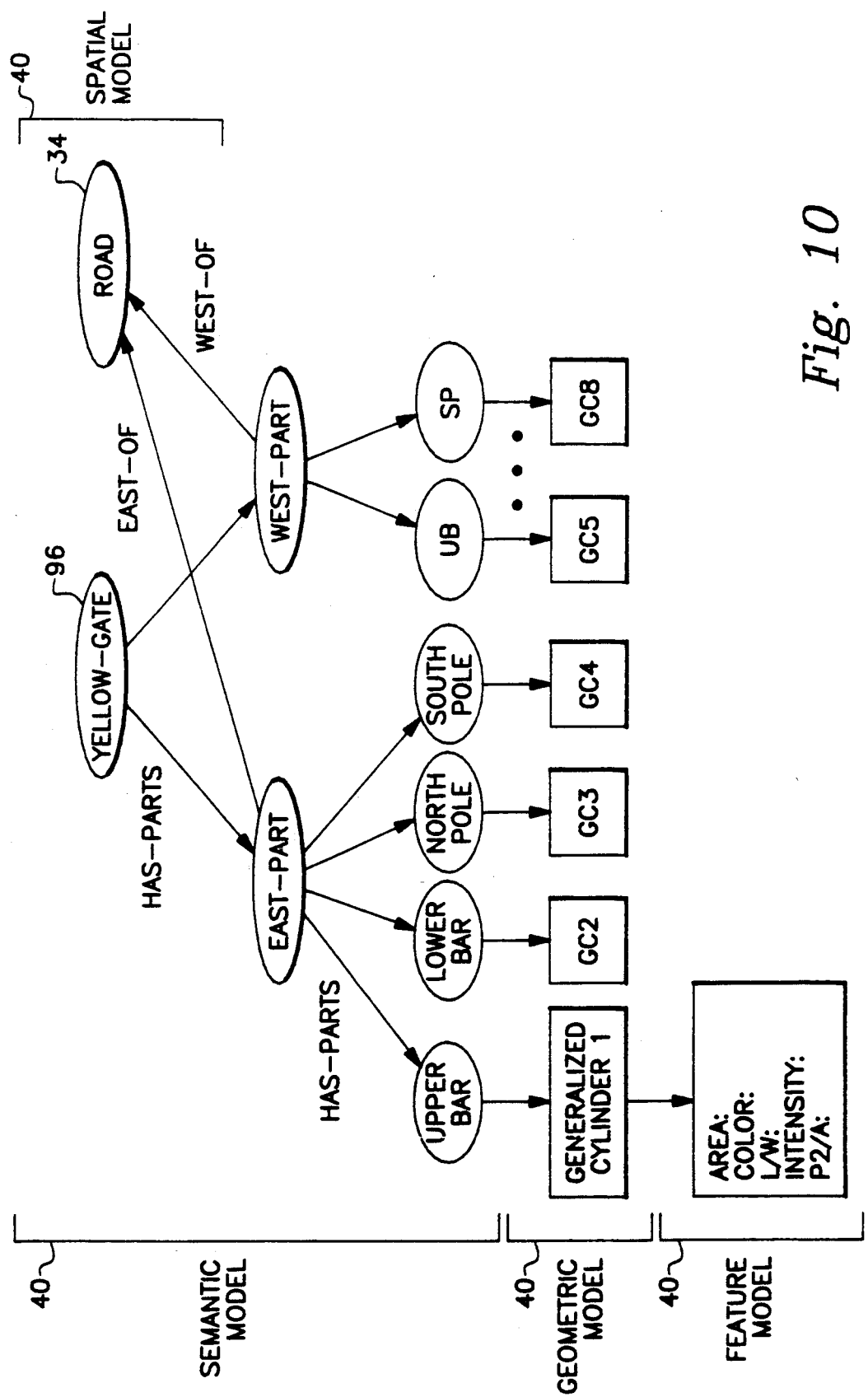
FIG. 10 is a schematic of a hybrid model of the yellow gate landmark.

Landmark expectations are based on stored map information of unit 14 (FIG. 1), objects models of unit 42 and camera model 76. Each landmark has a hybrid model 40 which includes spatial, feature, geometric and semantic information. FIG. 10 illustrates this hybrid model representation for the yellow gate 96, which also includes the:

—Map location
—Expected (x,y) location in the image
—Location with respect to the road (i.e., left, right) and approximate distance
—Location in 3-D The feature based model 40 includes information about local features such as : color, texture, intensity, size, length, width, shape, elongation, parameter square over area, linearity, etc. The values of most of the range dependent features such as the size, length, width, etc. are obtained from the generated geometric model at that given range and azimuth angle. Range independent features values are obtained from visual observations and training data. The geometric model 4 is landmark dependent and its parameters are range dependent. Different parts of yellow gate 96 are represented in a semantic network. The geometry of the gate parts in the image is the result of the 3-D projection on a 2-D plane, using camera model 76 given a certain range and azimuth.

System utilizes dynamic model matching. Each landmark has a number of dynamic models 40, as shown in FIGS. 1, 3 and 10. The predicted landmark appearance is a function of the estimated range and view angle to the object. The range and view angle are initially estimated from prior locations of the robot 20, map information and velocity, they can be corrected based on recognition results. The landmark recognition task is performed dynamically at a sampled clock rate. Different geometric models are used for different landmarks, for example telephone poles can be best represented as generalized cylinders, whereby buildings are better represented as wire frames. The different representations require the extraction of different image features.

There are three basic steps, outlined in FIG. 3, to the landmark recognition process after generating the prediction of the next expected site and its associated landmarks. These are: 1) landmark detection 17 of unit 36, 2) landmark recognition 19 of unit 36, and 3) map site verification 21 of unit 72 and landmark position update of unit 80 in the map. At each stage different sets of features are used. Detection 17 is a focus of attention stage, occurs at farther ranges, say greater than 45 meters. Very few details (such as structure) of landmarks can be observed, only dominant characteristics can be observed, such as color, size, elongation, straight lines, etc. From the map knowledge base 14, spatial information can be extracted, such as position of the landmarks with respect to the road 34 (left or right) and position (in a 2-D image) with respect to each other (above, below and between). So, using spatial knowledge abstracted in terms of spatial models 40 and some dominant feature models 40, landmarks can be detected, but not recognized with a relatively high degree of confidence. However, this varies from one landmark to another because some landmarks are larger than others, so it is possible to recognize them at such distances.

The second step 19 occurs at closer ranges, say 20–45 meters. At these ranges most objects show more details and structure. So segmentation is more reliable which makes it possible to extract lines (e.g., 88 and 89) and vertices (e.g., 90, 92, 93 and 94), of FIG. 8, which in turn makes it possible to use detailed geometric models 40 based on representations, such as generalized cyliders, wire frames and winged edge, depending on the landmarks. Nevertheless, feature and spatial based information is still used prior to matching the geometric model 40 to image content, because it greatly reduces the search space. One should note here that the feature and spatial models 40 used in the first step 17 are updated because the landmarks are perceived differently in the 2-D image at short ranges.

The third step is a verification stage 21 that occurs at very close range. At this stage, PREACTE confirms or denies the existence of the landmarks and the map site location to robot 20. Since at close ranges for some landmarks subparts can be identified, semantic models 40 can be used to produce a higher degree of confidence in the recognition process. Some landmarks may partly disappear from the field of view (FOV) 62 (FIG. 2) at this range. This information about the potential disappearance of objects from FOV 62 is obtained from the 3-D model of the landmark of unit 42, the camera model of unit 76, and the range from unit 78.

Figure 12B:
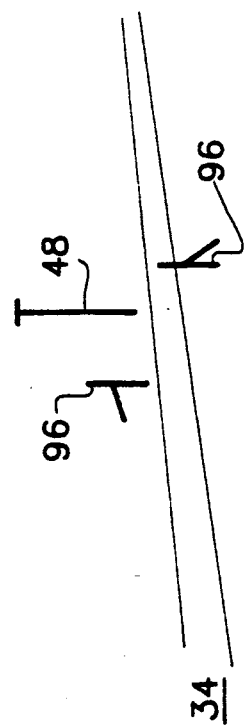
FIGS. 12a and 12b show projections of different angles and ranges.

Different landmarks require different strategies or plans for search. For example, yellow gate 96 of FIG. 12 has the distinctive color feature that is used for cueing the landmark recognition process to reduce the space search. Telephone pole 48 requires the emphasis of the length/width feature for directing the search, especially at farther ranges. These plans are explicitly stated in the landmark model for different ranges as shown below:

```
(defvar yellow-gate
   (make-instance 'object
      :name 'yellow-gate
      :parts (list y-g-west-wing y-g-east-wing)
      :geo-location '(−0.75   101.5   0.35)
      :plan '((70   30   detection)   (30   10
         recognition)   (10   0 verification))
      :detection '(color)
      :recognition '(color   length   width   area
         p2_over_area shape)
      :verification '(color   length   width   area
         p2_over_area   shape lines)   ))
```

Given the expected site model (ESM) 12 and the current image model 46, the objectives of the matching and verification process are two fold—to label the regions in the image corresponding to the expected landmarks and to determine the certainty level of the predicted map site location. The process by which the first objective is accomplished is as follows: 1) find the regions $\{R\}$ in the image model (IM) which satisfy the spatial constraints $SC_i$ imposed by landmark $l_i$ in the ESM SPATIAL_MODEL. This constraint application yields to more than one corresponding region. 2) Compute the evidence $E(l_i)$ that each $r_j$ in $\{R\}$ yields, using the FIND_EVIDENCE algorithm. 3) The $r_j$ that results in $E(l_i)$ max (provided it is a positive evidence) is considered as the best match candidate for $l_i$ (there may be more than one given that their values surpass a certain threshold). The second objective is achieved by aggregating the individual set of evidences $E(l_i)_{max}$ and the certainty level about the previous map site location and the potential error introduced by range from the previous site and the view angle of camera 60.

Given a set of regions $\{R\}$ in the image which satisfy the spatial constraints of the FOAA imposed by landmark $l_i$ in the Expected Site Model (ESM) 12 of unit 12. (there is usually more than one corresponding region) The evidence $E(l_i)$ is computed, using the FIND_EVIDENCE algorithm that each $r_j$ in $\{R\}$ yields. The $r_j$ that results in $E(l_i)$ $_{max}$ (provided it is a positive evidence) is considered as best match candidate for $l_i$. Then the individual set of evidences $E(l_i)_{max}$ are aggregated and the certainty level about the current map site location is computed.

The FIND_EVIDENCE algorithm considers that each landmark $l_i$ in the ESM of unit 12 has a set of attributes $\{A_{il}, ..., A_{ik}, ..., A_{in}\}$, each with a likelihood $LH_{ik}$. Each region $r_j$ in $\{R\}$ has a set of features $\{f_{jl}, ..., f_{jk}, ..., f_{jn}\}$. Note that $A_{ik}$ and $f_{ik}$ correspond to the same feature (in the model and the image), such as color, size, texture, etc. Given these features, one computes the evidence that $l_i$ is present in the image. This is accomplished by using a heuristic Bayesian formula. The Bayes equation is given by:

$$P(l_i/f_{j1},\ldots,f_{jk},\ldots,f_{jn}) = \frac{P(l_i) * P(f_{j1},\ldots,f_{jk},\ldots f_{jn}/l_i)}{P(f_{j1},\ldots,f_{jk},\ldots,f_{jn})} \quad (1)$$

By making the independence assumption among features, in a region and among features, occurrences in images, the above equation can be rewritten as:

$$P(l_i/f_{j1},\ldots,f_{jk},\ldots,f_{jn}) = \quad (2)$$

$$\frac{P(l_i)*P(f_{j1}/l_i)* \ldots *P(f_{jk}/l_i)* \ldots *P(f_{jn}/l_i)}{P(f_{j1})* \ldots *P(f_{jk})* \ldots *P(f_{jn})} =$$

$$P(l_i) * \prod_{k=1}^{n} \frac{P(f_{jk}/l_i)}{P(f_{jk})}$$

where n is the number of features and $P(l_i)$ is the initial probability of a landmark being found at a given site. $P(l_i)$ is initially set to 1 for all landmarks (nevertheless it could be a variable). $P(f_{jk})$ is the probability of occurrence of a feature in an image, which is equal to 1/(number of possible feature values). For example, if texture can take either of the four values: coarse, smooth, regular or irregular, then P (texture=smooth)=¼. Finally, $$P(f_{jk}/l_i) = \begin{cases} LH_{ik} & \text{if } f_{jk} \neq A_{ik} \\ \frac{1 - LH_{ik}}{d(f_{jk}, A_{ik})} & \text{if } f_{jk} \neq A_{ik} \end{cases} \quad (3)$$

which is best explained through the following example which includes, as given, two regions $r_1$ and $r_2$ in the image with different sizes $(f_{jk})$, SIZE $(r_1)$= SMALL and SIZE $(r_2)$=LARGE; and a model of landmark L, with the expected size to be LARGE $(A_{ik})$, with a likelihood $(LH_{ik})$ of 0.7. The SIZE feature can take any of the following ordered values: (SMALL, MEDIUM, LARGE). If $r_2$ is being matched to L, equation (3) yields 0.7, because $f_{jk}=A_{ik}$. On the other hand, if $r_1$ is being matched to L, then equation (3) yields (1−0.7)/2. The denominator 2 is used because LARGE is two unit distances (denoted by $d(f_{jk},A_{ik})$) from SMALL. We rewrite equation (2) as:

$$P(l_i/f_{j1},\ldots,f_{jk},\ldots,f_{jn}) = P(l_i) * \prod_{j=1}^{n} I(f_{jk}/l_i) \quad (4)$$

where $I(f_{jk}/l_i)$ is the term within the product sign. The value of $I(f_{jk}/l_i)$ can be greater than 1, because the heuristic nature of the formulation does not reflect a probalistic set of conditional events, as formulated in Bayes theory. Moreover, $P(l_i/f_{j1}, \ldots, f_{jk}, \ldots, f_{jn})$ can result in a very large number or a very small positive number. By taking the logarithm of both sides of equation (4), introducing $W_j$ as a normalization factor for each feature and dividing by the number of features (n), we have:

$$\text{Log}[P(l_i/f_{j1},\ldots,f_{jk},\ldots,f_{jn})] = \quad (5)$$

$$\text{Log}[P(l_i)] + \frac{\sum_{j=1}^{n} \text{Log}[I(f_{jk}/l_i) * W_j]}{n}$$

where $W_j$ is a normalization factor between 0 and 1.

Next, the evidence is introduced in terms E and e to be the logarithms of P and I*W, respectively, assuming $P(l_i)$ to be initially equal to 1. So, the evidence formula can be written as follows:

$$E(l_i) = \frac{\sum_{i=1}^{n} e(f_{jk}/l_i)}{n} \quad (6)$$

The values of $E(l_i)$ fall between 0 and 1. If $E(l_i)>0.50$, it means a "positive" set of evidences. On the other hand, if $E(l_i)<0.3$, it is interpreted as "negative" or "weak" evidence. Otherwise, $E(l_i)$ is characterized as "neutral".

An important feature that is incorporated in PREACTE is the utilization of positive as well as negative evidences to verify its expectations. There are many types of negative evidences that could be encountered during the hypothesis generation and verification process. The one that is of particular interest is when there is a highly negative evidence (for example, $E_{(l_i)max}<0.3$) about a "single" landmark in conjunction with very positive evidences about the other landmarks (average evidence >0.6) and a reasonable level of certainty about the previous site ($U_{s-1}<5$ discussed below). This case is interpreted as caused by one or more of the following: error in the dimension of the expectation zone bad segmentation results; and change in the expected view angle or range. In such a case PREACTE would enlarge the expectation zone 96 (i.e., negative evidence area) by a fixed margin and find the evidences introduced by the new set of regions 98 and 100 (in FIG. 9). The new search area 98 and 100 is a consequence of negative evidence are 96. If that step fails to produce an admissible set of evidences, then the expectation zone of the image is resegmented using a new set of parameters that are strictly object dependent.

Even though landmark recognition is introduced to assist the autonomous robot land navigation system, there is obviously uncertainty attached to the results of the recognition system, that is, there is map location uncertainty. the uncertainty Us is computed at each site location in the following manner:

$$U_s = (U_{s-1} + \alpha D) * \prod_{i=1}^{m} \frac{0.5}{E(l_i)_{max}}$$

where $U_s$=uncertainty at site s $U_{s-1}$=uncertainty at previous site

L=average accumulated error or uncertainty per kilometer by the robot navigation system, D=number of kilometers traveled between the previous and the current site, and $E(l_i)s$=evidence accumulated about landmark $l_i$ at site s.

$U_s$ has a minimum value of zero which indicate the lowest uncertainty, which is the value at the starting point. The upper limit of $U_s$ can be controlled by a threshold value and a normalization factor. $U_O$, the initial uncertainty, is equal to 1, $\alpha$ is the error factor introduced by the robot navigation system, it is set to a constant of 0.3 (for experimental reasons), and $E(l_i)_{max}$ is the maximum evidence of $l_i$. If two or more regions return evidences greater than 0.8, then the average is computed. The value 0.5 is used (as neutral evidence) to stabilize the function, m is the number of landmarks. The multiplicative nature of $U_s$ provides it with the capability of rapidly recovering its value given a high set of evidences at the current site and a high level of uncertainty at the previous site.

Figure 11:
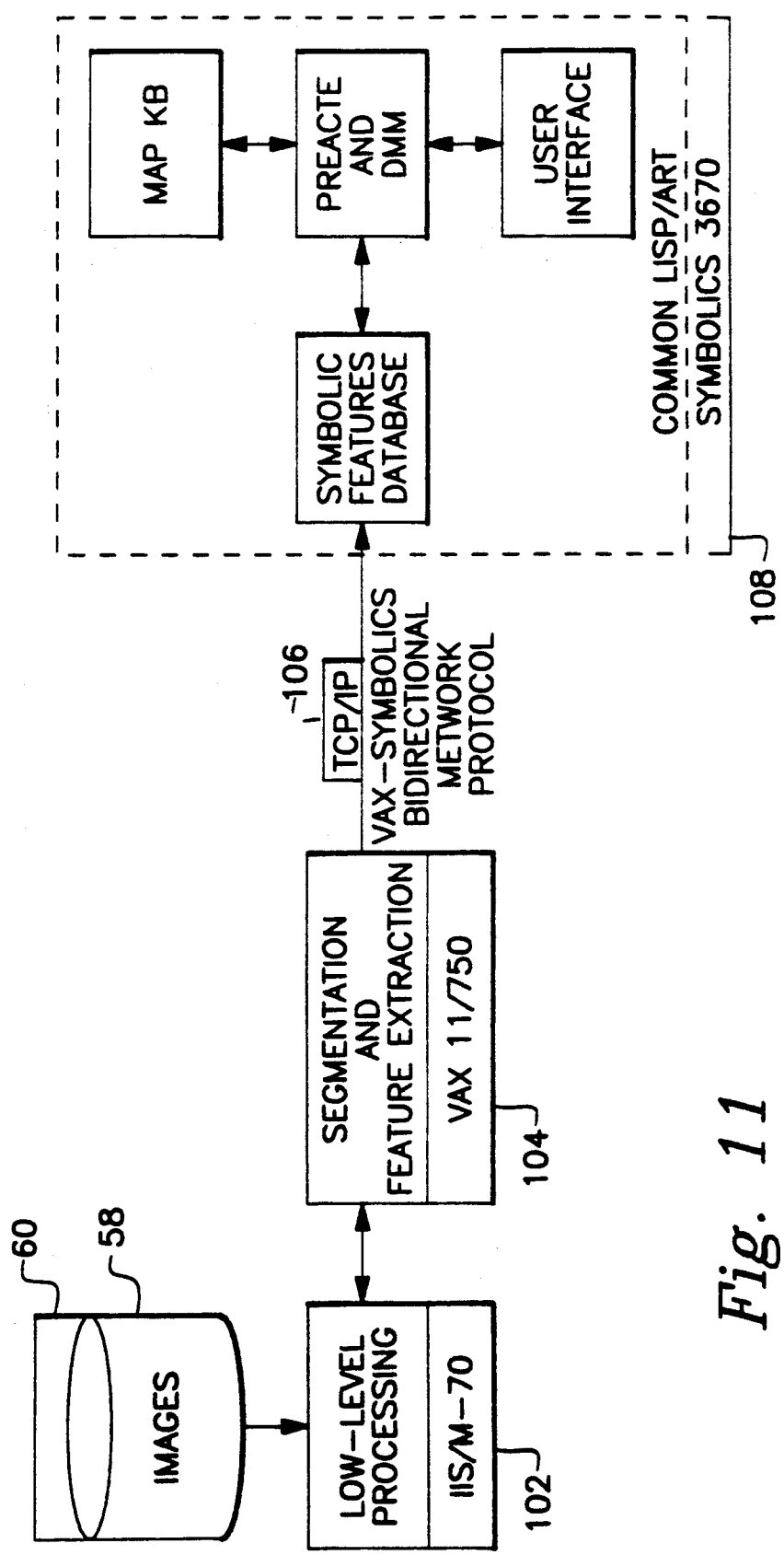

FIG. 11 reveals the hardware implementation of system 10. Images 58 are fed from camera 60 into image processor 102 (IIS/M-70). Processed images go onto computer 104 (VAX 11/750) for region segmentation and feature computation. Interface 106 interfaces computer 104 to computer 108 (Symbolics 3670). Computer 108 computes models, matching, mapping, verification, evidence accumulation, site uncertainty and other tasks of system 10.

A prototype system of the present invention was implemented in Common Lisp and ART (Automated Reasoning Tool) on the Symbolics 3670 computer. The image processing software was implemented in C language on the VAX 11/750 computer. The Symbolics computer hosts the whole PREACTE system 10.

PREACTE was tested on a number of images collected by a robotic vehicle 20 (FIG. 1) having a mounted camera 60. The image data was collected at 30 frames per second. In this test, the robotic vehicle started at map site 105 (see FIG. 5) and headed south at 10 kilometers per hour. The objective of the test was to predict and recognize landmarks, over a sequence of frames, close to the road.

Figure 12A:
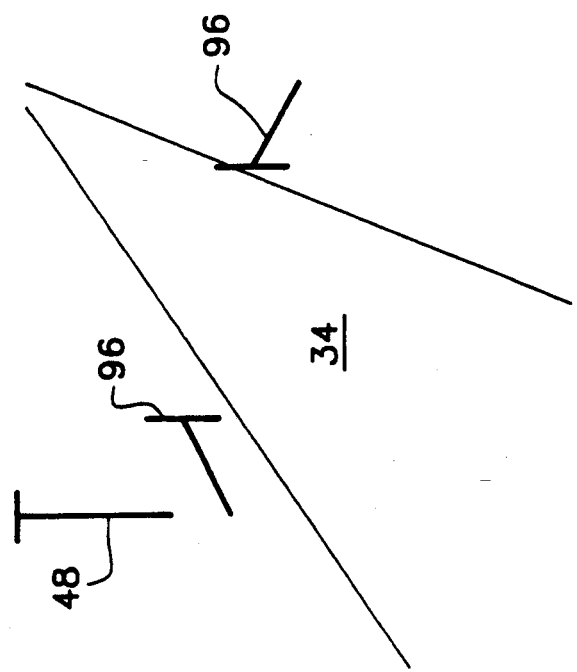
Figure 13:
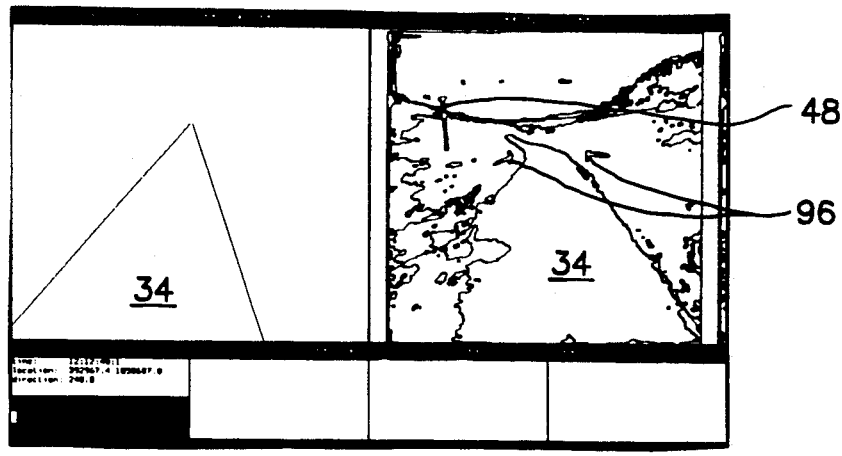
FIG. 13 shows the expected landmark image and segmented image with a projected road model.
Figure 14:
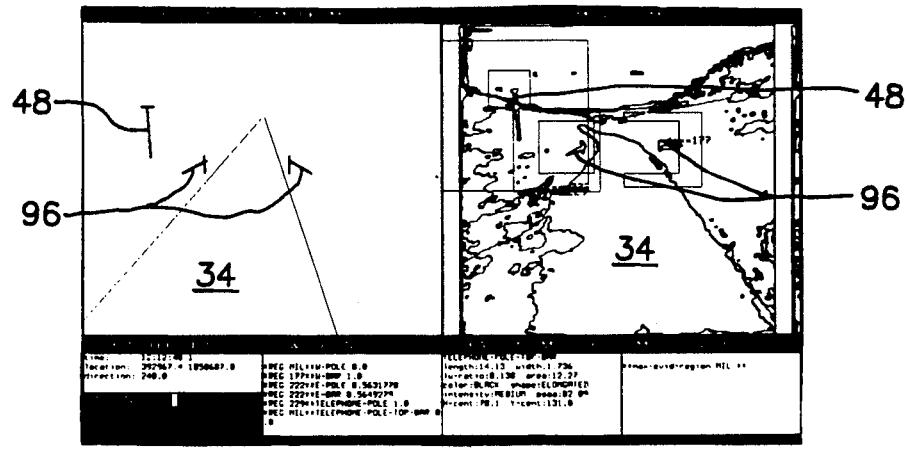
FIG. 14 reveals a matching process about to occur for parts.
Figure 15:
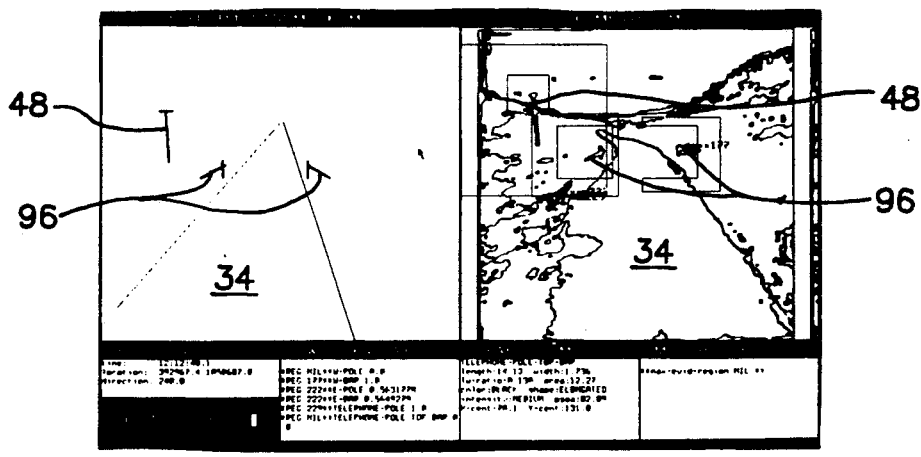
FIG. 15 shows the expected landmark image and segmented image at the end of the detection stage.
Figure 16:
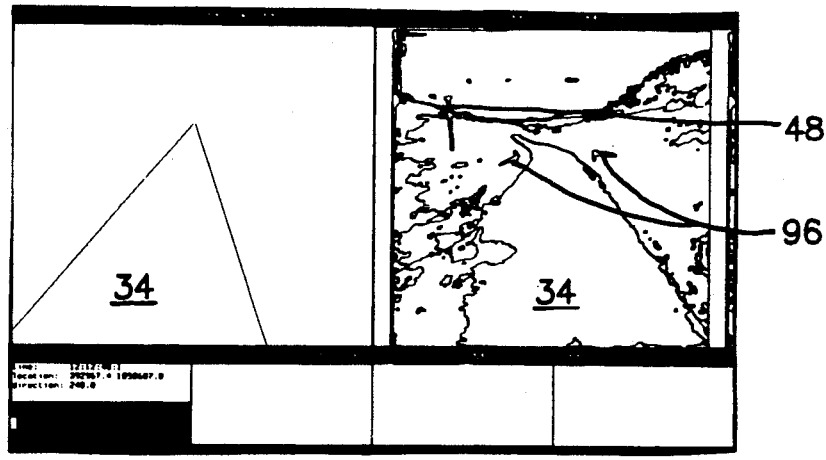
FIG. 16 shows the beginning of the recognition stage with new images processed.
Figure 17:
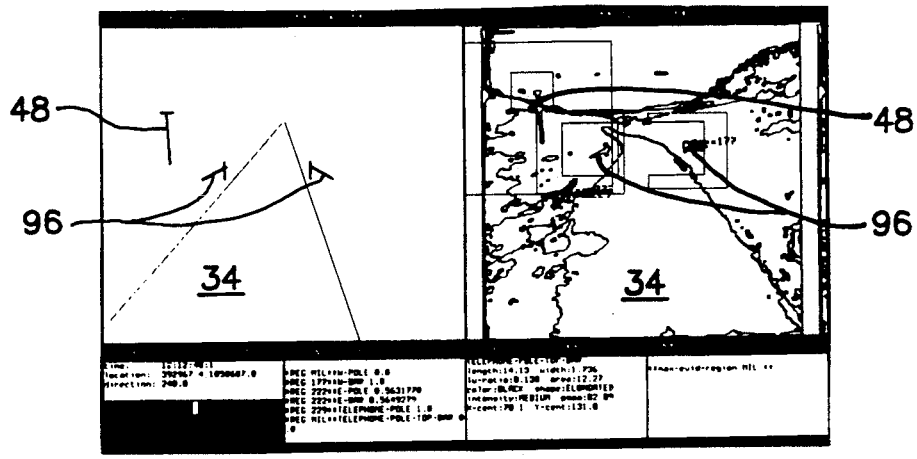
FIG. 17 reveals a new 2-D model of a scene being generated.
Figure 18:
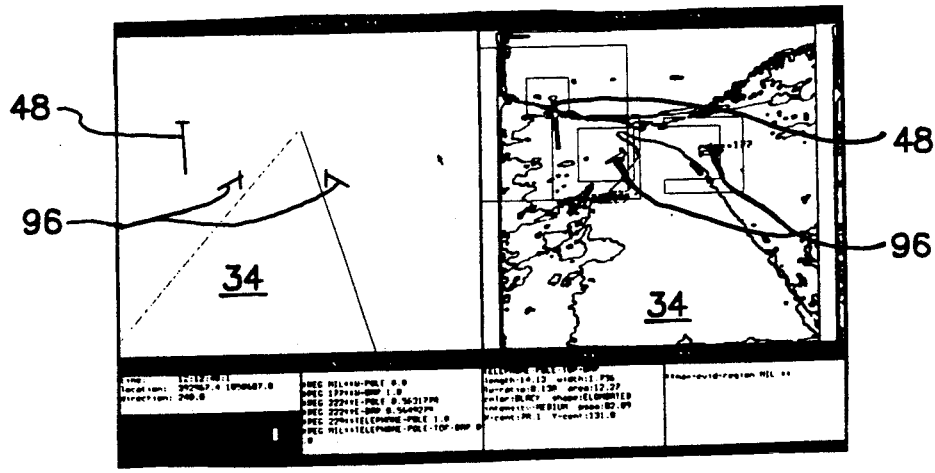
FIG. 18 has additional positive evidences of the landmark which reduce site uncertainty.
Figure 19:
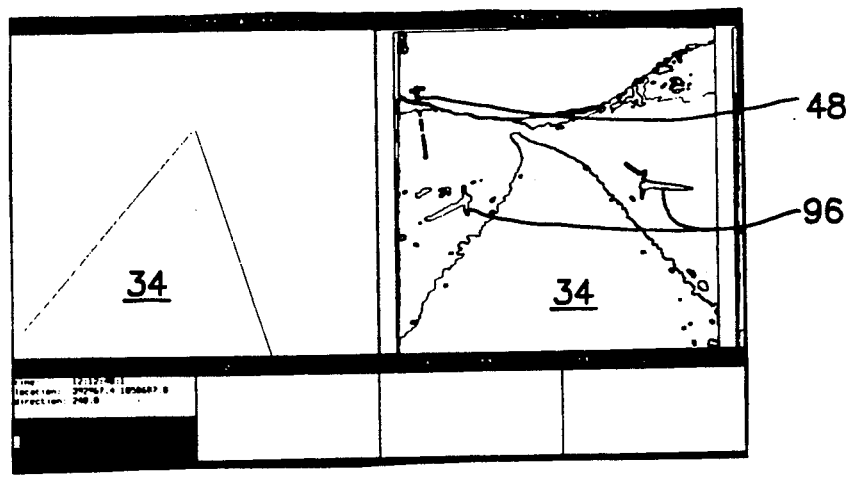
FIG. 19 is at the end of the recognition stage and at the beginning of the verification stage
Figure 20:
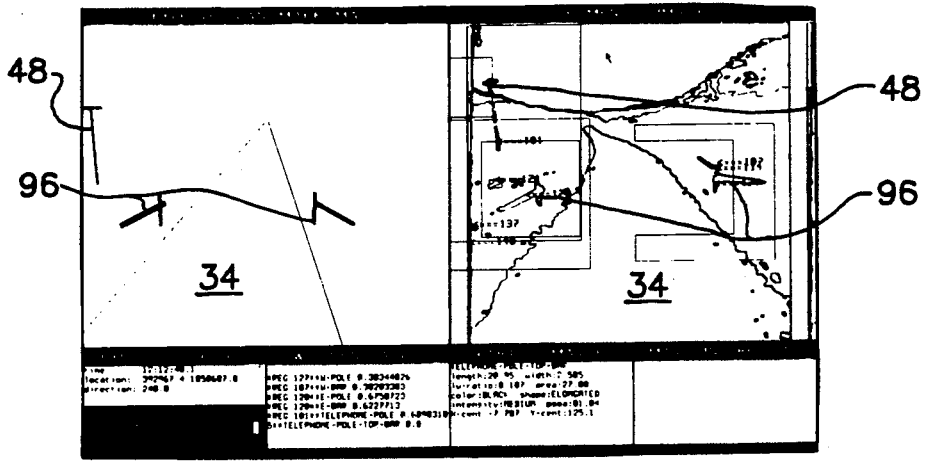
FIG. 20 shows the verification stage wherein site uncertainty is computed.
Figure 21:
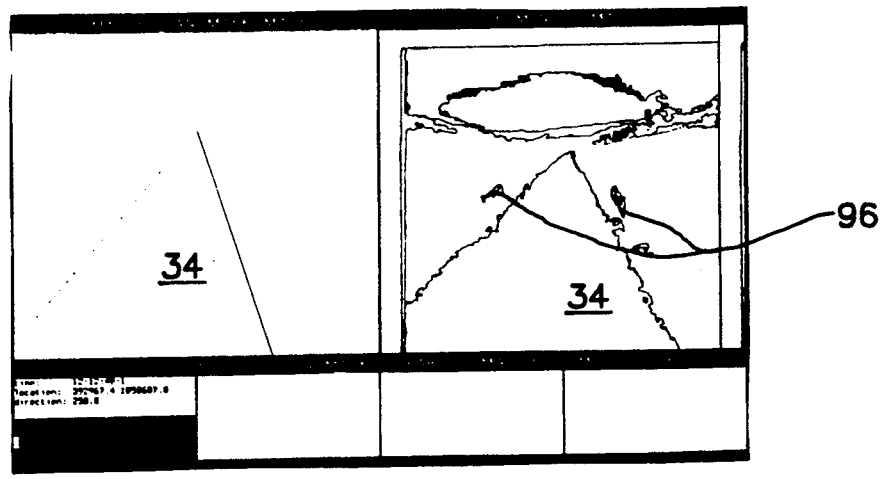
FIG. 21 shows a new site with a yellow gate.
Figure 22:
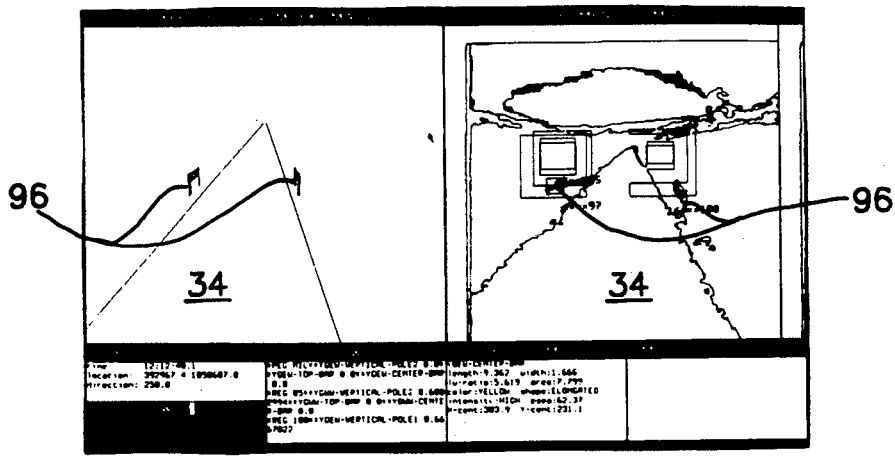
FIG. 22 indicates only the left part of the gate being detected.
Figure 23:
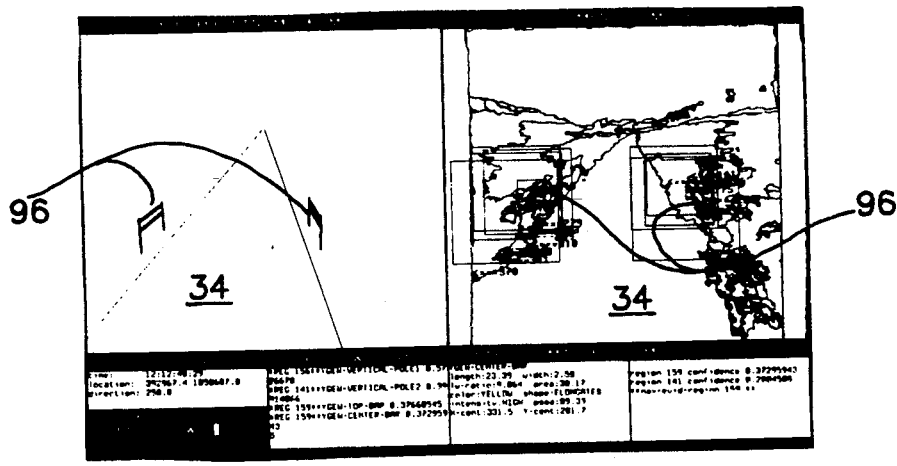
FIG. 23 is where size, shape, length, length-to-width ration and color are the emphasized features.
Figure 24:
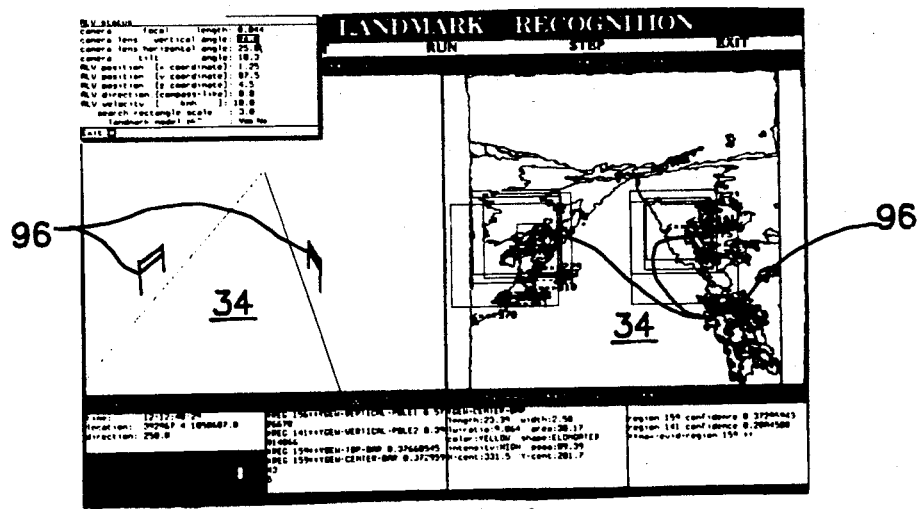
FIG. 24 is the point wherein the camera parameters can be modified.
Figure 25:
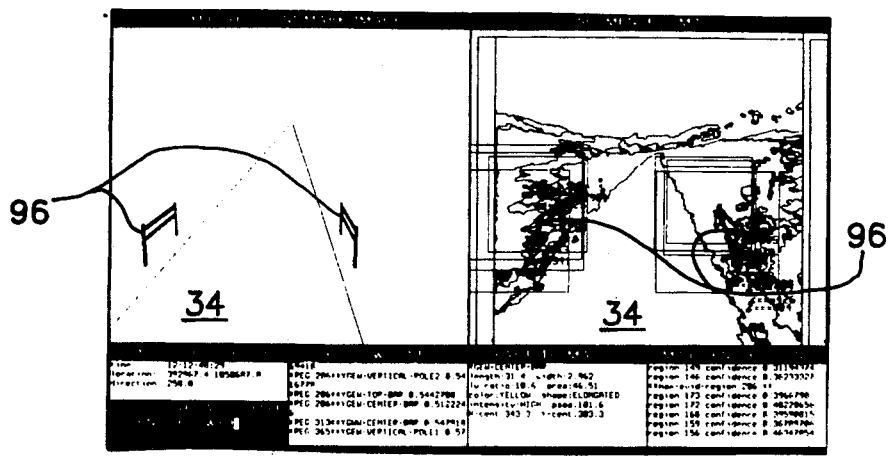
FIG. 25 reveals the gate at closer range during the recognition stage.
Figure 26:
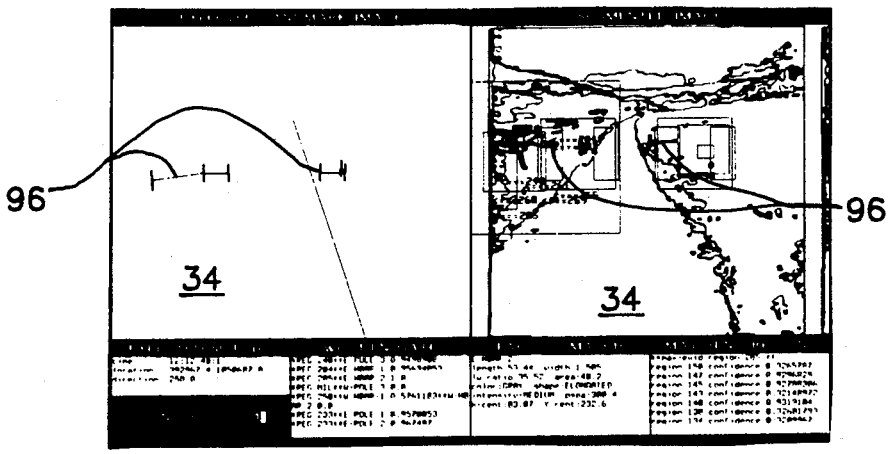
FIG. 26 shows another site with another gate.
Figure 27:
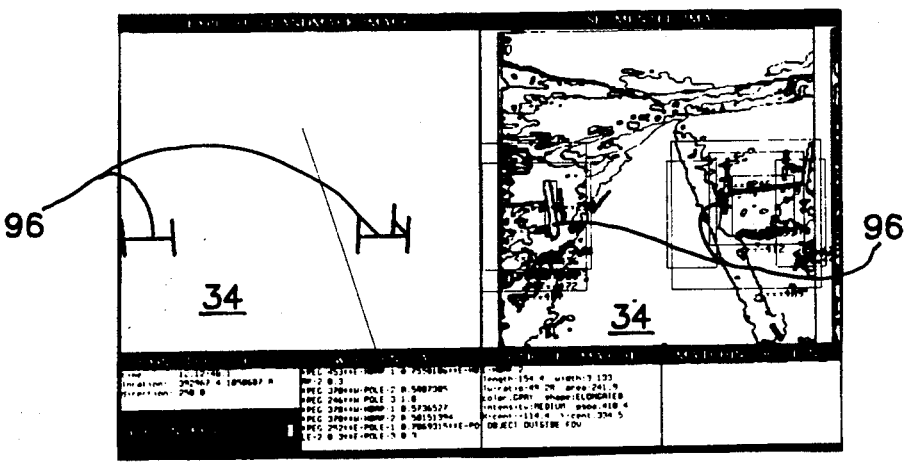
FIG. 27 shows the gate at close range.

FIGS. 12a and b display 2-D model projections from different view angles and ranges. FIGS. 13-27 show landmark recognition results at various sites. For purposes of illustration in the below-noted Figures, all gates are labeled 96, telephone poles are 48 and roads are 34. FIG. 13 shows a next predicted site. PREACTE projects road model 34 of the scene and an image is processed and segmented. FIG. 14 reveals a 2-D model generated of the expected site at the predicted range wherein matching occurs. FIG. 15 shows the end of the detection stage when the site uncertainty is computed. FIG. 16 is the beginning of the recognition stage wherein new images are processed and road model 34 is projected. FIG. 17 shows a new 2-D model of the scene generated with more gate parts identified. The rectangles over the segmented image indicate the FOAA's. The new model emphasizes features that includes intensity, length-to-width ratio and a shape measure. FIG. 18 has a site uncertainty that has decreased due to additional positive evidences about landmarks 48 and 96. FIG. 19 is of the end of the recognition stage and the beginning of the verification stage. FIG. 20 has a site uncertainty computed at the verification stage, which has increased because of higher matching requirements. FIG. 21 shows a new site having yellow gate 96. FIG. 22 reveals only the left part of gate 96 as being detected because the right part of gate 96 falls mostly outside of the FOAA. FIG. 23 shows a pattern that emphasizes size, shape, length, length-to-width ratio and color at the recognition stage. FIG. 24 is the stage where camera parameters may be changed as needed. FIG. 25 shows gate 96 at closer range in the recognition stage. The matching results have degraded because of poor segmentation results. FIG. 26 reveals another site with another gate and gate model 96. FIG. 27 has gate model 96 at very close range, but with the uncertainty value at an acceptable range. Dynamic model matching predicts some gate parts to be outside field of view 62 and avoids matching them.

The methods and processes in the embodiment of the present invention are implemented with the ensuing programming.

```
;;; -*- Mode: LISP; Syntax: ZETALISP; Package: USER; Base: 10; -*-

(defvar e-pole-1
  (make-instance 'g-cylinder
    :name        'e-pole-1
    :x1          -3.25
    :y1          200.0
    :z1          0.0
    :x2          -3.25
    :y2          200.0
    :z2          1.34112
    :r           0.063339995
    :color       0
    :s-color     'black
    :intensity   85
    :s-intensity 'low
    :r-shape     15
    :s-shape     'elongated
    :parts nil))

(defvar e-pole-2
  (make-instance 'g-cylinder
    :name        'e-pole-2
    :x1          -5.0
    :y1          200.0
    :z1          0.0
    :x2          -5.0
    :y2          200.0
    :z2          1.34112
    :r           0.063339995
    :color       0
    :s-color     'black
```

```
          :intensity 85
          :s-intensity 'low
          :r-shape 15
          :s-shape 'elongated
          :parts nil))

(defvar e-pole-3
  (make-instance 'g-cylinder
          :name     'e-pole-3
          :x1       -7.5
          :y1       197.0
          :z1       0.0
          :x2       -7.5
          :y2       197.0
          :z2       1.34112
          :r        0.063339995
          :color    0
          :s-color  'black
          :intensity 85
          :s-intensity 'low
          :r-shape 15
          :s-shape 'elongated
          :parts nil))

(defvar e-hbar-1
  (make-instance 'g-cylinder
          :name     'e-hbar-1
          :x1       -3.25
          :y1       200.0
          :z1       0.65
          :x2       -5.0
          :y2       200.0
          :z2       0.65
          :r        0.05
          :color    0
          :s-color  'gray
          :intensity 120
          :s-intensity 'medium
          :r-shape 15
          :s-shape 'elongated
          :parts nil))

(defvar e-hbar-2
  (make-instance 'g-cylinder
          :name     'e-hbar-2
          :x1       -5.0
          :y1       200.0
          :z1       0.65
          :x2       -7.5
          :y2       197.0
          :z2       0.65
          :r        0.05
          :color    0
          :s-color  'gray
          :intensity 120
          :s-intensity 'medium
          :r-shape 15
          :s-shape 'elongated
          :parts nil))

(defvar east-wood-gate
  (make-instance 'object
          :name     'east-wood-gate
          :parts    (list e-pole-1 e-pole-2 e-pole-3 e-hbar-1 e-hbar-2) ))

(defvar w-pole-1
  (make-instance 'g-cylinder
          :name     'w-pole-1
          :x1       3.25
          :y1       200.0
          :z1       0.0
```

```
            :x2     3.25
            :y2     200.0
            :z2     1.34112
            :r      0.063339995
            :color  0
            :s-color 'black
            :intensity 85
            :s-intensity 'low
            :r-shape 15
            :s-shape 'elongated
            :parts nil))

(defvar w-pole-2
   (make-instance 'g-cylinder
            :name    'w-pole-2
            :x1     5.0
            :y1     200.0
            :z1     0.0
            :x2     5.0
            :y2     200.0
            :z2     1.34112
            :r      0.063339995
            :color  0
            :s-color 'black
            :intensity 85
            :s-intensity 'low
            :r-shape 15
            :s-shape 'elongated
            :parts nil))

(defvar w-pole-3
   (make-instance 'g-cylinder
            :name    'w-pole-3
            :x1     5.0
            :y1     202.0
            :z1     0.0
            :x2     5.0
            :y2     202.0
            :z2     1.34112
            :r      0.063339995
            :color  0
            :s-color 'black
            :intensity 85
            :s-intensity 'low
            :r-shape 15
            :s-shape 'elongated
            :parts nil))

(defvar w-hbar-1
   (make-instance 'g-cylinder
            :name    'w-hbar-1
            :x1     3.25
            :y1     200.0
            :z1     0.65
            :x2     5.0
            :y2     200.0
            :z2     0.65
            :r      0.05
            :color  0
            :s-color 'gray
            :intensity 120
            :s-intensity 'medium
            :r-shape 15
            :s-shape 'elongated
            :parts nil))

(defvar w-hbar-2
   (make-instance 'g-cylinder
            :name    'w-hbar-2
            :x1     5.0
            :y1     200.0
```

```
            :z1      0.65
            :x2      5.0
            :y2      202.0
            :z2      0.65
            :r       0.053339995
            :color   0
            :s-color 'gray
            :intensity 120
            :s-intensity 'medium
            :r-shape 15
            :s-shape 'elongated
            :parts nil))

(defvar west-wood-gate
    (make-instance 'object
         :name     'west-wood-gate
         :parts    (list w-pole-1 w-pole-2 w-pole-3 w-hbar-1 w-hbar-2) ))

(defvar wooden-gate
    (make-instance 'object
         :name     'wooden-gate
         :parts    (list west-wood-gate east-wood-gate)
         :location '(-0.75 198 0.5)
         :plan     '((30 16 detection) (15.9 11 recognition) (10.9 0 verification))
         :detection    '(:intensity)
         :recognition  '(:intensity :lwr)
         :verification '(:intensity :r-shape :lwr);;:lines
                        ) )
```

```
;;; -*- Mode: LISP; Syntax: ZETALISP; Package: USER; Base: 10; -*-

;=============================================================
;=============================================================
;=============================================================
;;;PROGRAM: ALV
;;;SYSTEM: SD2 (SCENE DYNAMICS 2)
;;;DESCRIPTION: THIS PROVIDES THE PARAMETERS OF THE CAMERA MODEL AND VARIABLES
;;;             WHICH CAN MODIFIED THROUGH A MENU (BY CLICKING ON "ALV" IN WINDOW)
;;;
;;;PRIMARY CALLERS: WINDOW
;;;RETURNS: CHOOSE MENU
;;;NOTES:
;=============================================================
;=============================================================
;=============================================================

;=============================================================
(defvar dt    0.0)   ; time interval
(defvar VL    10.0)  ; ALV velocity
(defvar D     0.044) ; d = 44 mm
(defvar VA    24.0)  ; vertical   angle in degrees
(defvar HA    25.0)  ; horizontal angle in degrees
(defvar TA    10.3)  ;            tilt angle in degrees
(defvar DA    0.0)   ; direction  angle in degrees (0.0 = North)
(defvar sc    3.0)   ; scale of the search rectangle
(defvar left-road-side  -2.75)
(defvar right-road-side  2.75)
(defvar x-pixel-offset 20)

;camera position (on top of the ALV)
(defvar X0  1.25)
(defvar Y0  0.0)
(defvar Z0  4.5)

;landmark debug loop variable
(defvar ex t)
```

```
(defun alv-status ()
  (tv:choose-variable-values
    '((d "camera     focal      length" :number)
      (va "camera lens    vertical angle" :number)
      (ha "camera lens horizontal angle" :number)
      (ta "camera      tilt        angle" :number)
      (x0 "ALV position  [x coordinate]" :number)
      (y0 "ALV position  [y coordinate]" :number)
      (z0 "ALV position  [z coordinate]" :number)
      (da "ALV direction [compass-like]" :number)
      (VL "ALV velocity  [    km/h    ]" :number)
      (sc "    search rectangle scale    " :number)
      (ex "       landmark model ok?     " :boolean))
    ':label "ALV status"))
```

;;; -*- Mode: LISP; Syntax: ZETALISP; Package: USER; Base: 10; -*-

```
(defun show-curve-road (cx cy lrad rrad ba ea n)
  (let ((y0 0.0))
    (send icon-pane :clear-window)
    (prog ((i 0) (delta (// (- ea ba) n)) il ir)
      loop
      (when (= i n) (return nil))
      (setq il
        (project
          (list (+ cx (* lrad (sind ba))) (+ cy (* lrad (cosd ba))) 0.0)))
      (setq ir
        (project
          (list (+ cx (* rrad (sind ba))) (+ cy (* rrad (cosd ba))) 0.0)))
      (send icon-pane :draw-point
        (+ (round (car il)) x-pixel-offset) (round (cadr il)) tv:alu-ior)
      (send icon-pane :draw-point
        (+ (round (car ir)) x-pixel-offset) (round (cadr ir)) tv:alu-ior)
      (setq i (+ 1 i))
      (setq ba (+ ba delta))
      (go loop) )))

(defun show-straight-road (lb le rb re)
  (let ((y0 0.0))
    (send icon-pane :clear-window)
    (setq lb (project lb))
    (setq le (project le))
    (setq rb (project rb))
    (setq re (project re))
    (send icon-pane :draw-line
      (+ (round (car lb)) x-pixel-offset) (round (cadr lb))
      (+ (round (car le)) x-pixel-offset) (round (cadr le))
      tv:alu-ior)
    (send icon-pane :draw-line
      (+ (round (car rb)) x-pixel-offset) (round (cadr rb))
      (+ (round (car re)) x-pixel-offset) (round (cadr re))
      tv:alu-ior) ))
```

;;; -*- Mode: LISP; Syntax: ZETALISP; Package: USER; Base: 10; -*-

;;;PROGRAM:FRAME
;;;SYSTEM: SD2 (SCENE DYNAMICS 2)
;;;DESCRITION: THIS WINDOW SYSTEM USER INTERFACE
;;;
;;;

```
;;;PRIMARY CALLERS: >SD2>REASONING CALLS THE FUNCTION ACQUIRE-DIRECTIVE
;;;RETURNS: WINDOW DISPLAY
;;;NOTES:
;================================================
;================================================
;================================================

;================================================
;                    F R A M E    V A R I A B L E S
;================================================
(defvar panes)
(defvar audit-pane)
(defvar lr-frame)
(defvar frame-title-pane)
(defvar command-pane)
(defvar icon-title-pane)
(defvar icon-pane)
(defvar image-title-pane)
(defvar image-pane)
(defvar site-title-pane)
(defvar site-pane)
(defvar landmarks-title-pane)
(defvar landmarks-pane)
(defvar regions-title-pane)
(defvar regions-pane)
(defvar expectation-title-pane)
(defvar expectation-pane)
(defvar bottom-pane)
(defvar frame-configuration)
(defvar command-pane-item-list)

;================================================
;                    F O N T    N A M E S
;================================================
(defvar   big-menu-font-name      'fonts:tr18b)
(defvar       title-font-name     'fonts:centuryschoolbook105b)
(defvar   command-font-name       'fonts:tr18b)
(defvar   small-tr-font-name      'fonts:tr10b)
(defvar      icon-font-name       'fonts:tr10b);inews)
(defvar      user-font-name       'fonts:medfnb)
(defvar user-bold-font-name       'fonts:medfnb)
(defvar     label-font-name       'fonts:tr18b)
(defvar   big-menu-font           (eval   big-menu-font-name))
(defvar       title-font          (eval      title-font-name))
(defvar   command-font            (eval   command-font-name))
(defvar   small-tr-font           (eval   small-tr-font-name))
(defvar      icon-font            (eval      icon-font-name))
(defvar      user-font            (eval      user-font-name))
(defvar user-bold-font            (eval user-bold-font-name))
(defvar     label-font            (eval     label-font-name))

;================================================
;              FRAME AND PANE FLAVORS
;================================================

;================================================
(defflavor landmark-recognition-frame ()
;================================================
        (tv:select-mixin
         tv:bordered-constraint-frame-with-shared-io-buffer
         tv:window))

;================================================
(defflavor label-pane-flavor ()
;================================================
        (tv:window-pane
         tv:centered-label-mixin))
```

```
;===================================================================
(defflavor history-pane-flavor ()
;===================================================================
        (;message-mixin
         label-pane-flavor))

;===================================================================
(defflavor status-pane-flavor ()
;===================================================================
        (;label-pane-flavor
         tv:choose-variable-values-pane))

;===================================================================
(defflavor listener-flavor ()
;===================================================================
        (label-pane-flavor))

;====
;           F R A M E    D E F I N I T I O N S
;====

;===================================================================
(defun init-command-pane-item-list ()
  (setq command-pane-item-list
    '(("ALV"           :value :alv     :font label-font)
      ("RESTART"       :value :restart :font label-font)
      ("RUN"           :value :run     :font label-font)
      ("STEP"          :value :step    :font label-font)
      ("EXIT"          :value :exit    :font label-font) )))

;===================================================================
(defun set-panes ()
  (setq
    panes
    '((frame-title-pane
         label-pane-flavor
         :label (:string "PREACTE   LANDMARK   RECOGNITION" :font title-font)
         :reverse-video-p t
         :border-margin-width 0
         :blinker-p nil)

(command-pane
         tv:command-menu-pane
         :font-map (,command-font-name)
         :label nil
         :border-margin-width 0
         :item-list ,(init-command-pane-item-list))

(site-title-pane
         label-pane-flavor
         :label (:string "EXPECTED SITE"   :font label-font)
         :reverse-video-p t
         :border-margin-width 0
         :blinker-p nil)

(site-pane
         label-pane-flavor
         :label nil
         :reverse-video-p nil
         :border-margin-width 0
         :blinker-p nil
         :more-p nil)

(landmarks-title-pane
         label-pane-flavor
         :label (:string "EXPECTED LANDMARKS" :font label-font)
         :reverse-video-p t
         :border-margin-width 0
         :blinker-p nil)
```

```
(landmarks-pane
  label-pane-flavor
  :label nil
  :reverse-video-p nil
  :border-margin-width 0
  :blinker-p nil
  :more-p nil)

(expectation-title-pane
  label-pane-flavor
  :label (:string "PART TO MATCH" :font label-font)
  :reverse-video-p t
  :border-margin-width 0
  :blinker-p nil)

(expectation-pane
  label-pane-flavor
  :label nil
  :reverse-video-p nil
  :border-margin-width 0
  :blinker-p nil
  :more-p nil)

(regions-title-pane
  label-pane-flavor
  :label (:string "MATCHING REGIONS"   :font label-font)
  :reverse-video-p t
  :border-margin-width 0
  :blinker-p nil)

(regions-pane
  label-pane-flavor
  :label nil
  :reverse-video-p nil
  :border-margin-width 0
  :blinker-p nil
  :more-p nil)

(icon-title-pane
  label-pane-flavor
  :label (:string "EXPECTED LANDMARK IMAGE" :font label-font)
  :reverse-video-p t
  :border-margin-width 0
  :blinker-p nil)

(icon-pane
  label-pane-flavor
  :font-map (,user-font-name ,icon-font-name)
  :label nil
  :border-margin-width 0
  :deexposed-typeout-action :permit
  :blinker-p nil
  :more-p nil)

(image-title-pane
  label-pane-flavor
  :label (:string "SEGMENTED IMAGE" :font label-font)
  :reverse-video-p t
  :border-margin-width 0
  :blinker-p nil)

(image-pane
  label-pane-flavor
  :font-map (,user-font-name ,icon-font-name)
  :label nil
  :border-margin-width 0
  :deexposed-typeout-action :permit
  :blinker-p nil
  :more-p nil)

(bottom-pane
  label-pane-flavor
```

```
            :label nil
            :font-map (,label-font-name)
            :reverse-video-p t
            :border-margin-width 0
            :blinker-p t
            :more-p nil) )))   -_
```

```
(defun set-frame-configuration ()
  (setq
    frame-configuration
      '((configuration
          ((frame-title-pane command-pane strip1 strip2 strip3 strip4)
           ((frame-title-pane      41))
           ((command-pane :ask :pane-size))
           ((strip1 :horizontal   (26)
              (icon-title-pane image-title-pane)
              ((icon-title-pane        :even)
               (image-title-pane       :even))))
           ((strip2 :horizontal   (484)
              (icon-pane image-pane)
              ((icon-pane              :even)
               (image-pane             :even))))
           ((strip3 :horizontal   (26)
              (site-title-pane landmarks-title-pane expectation-title-pane regions-title-pane)
              ((site-title-pane        :even)
               (landmarks-title-pane   :even)
               (expectation-title-pane :even)
               (regions-title-pane     :even))))
           ((strip4 :horizontal (:even)
              (strip5 landmarks-pane expectation-pane regions-pane)
              ((strip5 :vertical    ( :even)
                 (site-pane bottom-pane)
                 ((bottom-pane            66  ))
                 ((site-pane             :even)))
               (landmarks-pane        :even)
               (expectation-pane      :even)
               (regions-pane          :even)) )))) )))
```

```
(defun make-frame ()
  (set-frame-configuration)
  (set-panes)
  (setq
    lr-frame
      (tv:make-window
        'landmark-recognition-frame
        :borders       4
        :label         nil
        :panes         panes
        :constraints   frame-configuration
        :configuration 'configuration
        :save-bits     t))
  (init-panes)
  t)
```

```
(defun init-panes ()
  (setq frame-title-pane       (send lr-frame :get-pane 'frame-title-pane))
  (setq command-pane           (send lr-frame :get-pane 'command-pane))
  (setq icon-title-pane        (send lr-frame :get-pane 'icon-title-pane))
  (setq icon-pane              (send lr-frame :get-pane 'icon-pane))
  (setq image-title-pane       (send lr-frame :get-pane 'image-title-pane))
  (setq image-pane             (send lr-frame :get-pane 'image-pane))
  (setq site-title-pane        (send lr-frame :get-pane 'site-title-pane))
  (setq site-pane              (send lr-frame :get-pane 'site-pane))
  (setq regions-title-pane     (send lr-frame :get-pane 'regions-title-pane))
  (setq regions-pane           (send lr-frame :get-pane 'regions-pane))
  (setq landmarks-title-pane   (send lr-frame :get-pane 'landmarks-title-pane))
  (setq landmarks-pane         (send lr-frame :get-pane 'landmarks-pane))
  (setq expectation-title-pane (send lr-frame :get-pane 'expectation-title-pane))
  (setq expectation-pane       (send lr-frame :get-pane 'expectation-pane))
  (setq bottom-pane            (send lr-frame :get-pane 'bottom-pane)))
```

```
(defun menup (blip)
  (and
    blip
    (listp blip)
    (eq (car blip) ':menu)) )

(defun mousep (blip)
  (and
    blip
    (listp blip)
    (eq (car blip) ':mouse-button)) )

(defun variable-choice (blip)
  (and
    blip
    (listp blip)
    (eq (car blip) ':variable-choice)) )

(defun acquire-directive ()
  (let ((blip (send lr-frame ':any-tyi)))
    (cond
      ((menup blip)
        (caddr (cadr blip)))
      ((mousep blip)
        (send-if-handles (third blip) :pane-blip (second blip)))
      (t (send lr-frame :untyi blip)
        (send bottom-pane :clear-window)
        (format bottom-pane "~X~A" (eval (read bottom-pane)))) )))

;;; -*- package: user; syntax: zetalisp; base: 10; fonts: CPTFONT,CPTFONTB -*-

(defvar NUMFEATS        100)
(defvar INDEXROWS       500)
(defvar INDEXCOLS         4)
(defvar CODEROWS       2000)
(defvar CODECOLS          4)
(defvar RAGROWS        1000)
(defvar RAGCOLS           2)

; this portion provides the offset index, the constant names for
; those offset indices within feature vector files, and the origin
; of each feature for the mid level processing in scene analysis.

; features 0-10 are obtained from CONNRGN
(defvar LABEL_INDX         0)    ; region label
(defvar AREA_INDX          1)    ; area = number of pixels
(defvar MEAN_INDX          2)    ; average value of pixels over area
(defvar VARIANCE_INDX      3)    ; variance of mean over area (defvar XCNTR_INDX         4)    ; xcentroid of region
(defvar YCNTR_INDX         5)    ; ycentroid of region
(defvar XMIN_INDX          6)    ; minimum x value = leftmost col
(defvar XMAX_INDX          7)    ; maximum x value = rightmost col
(defvar YMIN_INDX          8)    ; minimum y value = uppermost row
(defvar YMAX_INDX          9)    ; maximum y value = lowermost row
(defvar YMINX_INDX        10)    ; minimum x value in the ymin row
```

```
; features 4-10 revisited for those who prefer the row/col to y/x
(defvar COLMEAN_INDX        4)
(defvar ROWMEAN_INDX        5)
(defvar COLMIN_INDX         6)
(defvar COLMAX_INDX         7)
(defvar ROWMIN_INDX         8)
(defvar ROWMAX_INDX         9)
(defvar ROWMINCOL_INDX     10)

; featues 11-15 are obtained from WINVAR
(defvar RGNWNDWS_INDX      11)   ; number of windows over region
(defvar MEANWNDWMEANS_INDX 12)   ; mean of window means
(defvar VARWNDWMEANS_INDX  13)   ; variance of window means
(defvar MEANWNDWVARS_INDX  14)   ; mean of window variances
(defvar VARWNDWVARS_INDX   15)   ; variance of window variances ; feature 16 is obtained from TRACERGN
(defvar PERIMETER_INDX     16)   ; number of pixels on perimeter ; features 17-19 are obtained from FEATCALC
(defvar NUMADJRGNS_INDX    17)   ; number of adjacent regions
(defvar CONVEXITY_INDX     18)   ; convexity measure based on feature 11
(defvar PER2DIVAREA_INDX   19)   ; perimeter squared / area (defvar FILLRATIO_INDX     20)   ; fill ratio to bounding box
(defvar LWRATIO_INDX       21)   ; length(x) / width(y)

; hue value
(defvar HUE_INDX           22)

; features 26-29 used to manipulate the virtual region structures
(defvar PARENT_INDX        26)   ; region number of merged parent
(defvar LEFTCHILD_INDX     27)   ; region 1 of 2 merged regions
(defvar RIGHTCHILD_INDX    28)   ; region 2 of 2 merged regions
(defvar DEPTH_INDX         29)   ; number of levels of children ; features 30-49 are the moments obtained from MOMENTS
(defvar I00_INDX           30)
(defvar I10_INDX           31)
(defvar I01_INDX           32)
(defvar I20_INDX           33)
(defvar I11_INDX           34)
(defvar I02_INDX           35)
(defvar I30_INDX           36)
(defvar I21_INDX           37)
(defvar I12_INDX           38)
(defvar I03_INDX           39)
(defvar S00_INDX           40)
(defvar S10_INDX           41)
(defvar S01_INDX           42)
(defvar S20_INDX           43)
(defvar S11_INDX           44)
(defvar S02_INDX           45)
(defvar S30_INDX           46)
(defvar S21_INDX           47)
(defvar S12_INDX           48)
(defvar S03_INDX           49)

; These features are based on the moments and added by FEATCALC (defvar TANTHETA_INDX      50)
(defvar ELONG1_INDX        51)

; These features are added by perfeats (defvar NUMCHANGES_INDX    52)
(defvar LENGTHMAX_INDX     53)
(defvar WIDTHMAX_INDX      54)
(defvar LENGTHMEAN_INDX    55)
(defvar WIDTHMEAN_INDX     56)
```

```
(defvar LENGTHVAR_INDX      57)
(defvar WIDTHVAR_INDX       58)
(defvar RECTANGULAR_INDX    59)
(defvar LINEARITY1_INDX     60)
(defvar LINEARITY2_INDX     61)
(defvar LINEARITY3_INDX     62)

; Classification information (defvar CLASS1TYPE_INDX     70)
(defvar CLASS1CERT_INDX     71)
(defvar CLASS2TYPE_INDX     72)
(defvar CLASS2CERT_INDX     73)
(defvar CLASS3TYPE_INDX     74)
(defvar CLASS3CERT_INDX     75)
(defvar CLASS4TYPE_INDX     76)
(defvar CLASS4CERT_INDX     77)
(defvar CLASS5TYPE_INDX     78)
(defvar CLASS5CERT_INDX     79)

(defvar
  *l-o-regions*
    (make-array '(520 70)))
(defvar n-regions   0)
(defvar n-features  0)
(defvar edge-file)

(defvar *frame-wdw* nil)
(defvar *frame-bit-arr* nil)
(defvar *frarr3476B9654334* nil)
(defvar *arr* nil)

;;;
(defun create-frame-window (h-pos v-pos h-size v-size)
    ;creates a graphics window and returns it as an object
    ;label must be a string
    (tv:make-window
       'tv:window
       ':position (list h-pos v-pos)
       ':inside-size (list h-size v-size)
       ':label nil
       ':blinker-p nil
       ':save-bits t
       ':expose-p t))

(defvar wdw (create-frame-window 250 100 512 484))

;;;
(defun create-shadow-array (wdw)
    ;creates an array which can hold the entire window
    (multiple-value-bind (h-size v-size) (send wdw :inside-size)
       (tv:make-sheet-bit-array wdw h-size v-size)))

(defvar arr (create-shadow-array wdw))

;;;copy-window-to-array
(defun wa (wdw)
   (send wdw :expose)
   (multiple-value-bind (h-size v-size)  (send wdw :inside-size)
     (send wdw  :bitblt-from-sheet tv:alu-seta h-size v-size 0 0 arr 0 0)))

;;;copy-array-to-window
(defun aw (wdw)
   (send wdw :expose)
   (multiple-value-bind (h-size v-size)  (send wdw :inside-size)
     (send wdw :bitblt  tv:alu-seta h-size v-size arr 0 0 0 0)))

;;;
(defun dump-shadow-array (arr file-name)
    (sys:dump-forms-to-file file-name
       (list '(setq *frarr3476B9654334* ,arr))))
```

```
;;;load-shadow-array
(defun la (filename)
   (load filename)
   *frarr347689654334*)

;;; ascii-to-window
(defun cw (filename &aux x)
   (send wdw :expose)
   (send wdw :clear-window)
   (with-open-file (infile filename)
     (do ((instring (readline infile) (readline infile))
          (i         0                   (+ i 1))
          (pix       0                    0))
         ((or (null instring) (>= i 484)))
         (do ((j        0                  (+ j 1)))
             ((or  (null instring) (>= j 86)))
             (setq x (- (aref instring j) 48))
             (do ((b 0 (+ b 1)))
                 ((>= b 6))
                 (when (cl::logbitp b x)
                   (send wdw  :draw-point
                     (+ b (* j 6))      i
                     tv:alu-seta)))))))

;;;save image
(defun sv (ouf)
    (wa wdw) ;window to array
    (dump-shadow-array arr ;array to file
       (string-append "frodo:>gluch>" ouf)))

(defun image-to-parts (fname)
   (let ((arr (la fname)))
     (aw image-pane)))
```
FRODO:>hatem>sd3>initialization.lisp.1

```
;;; -*- Mode: LISP; Syntax: ZETALISP; Package: USER; Base: 10; -*-

(unless (boundp 'lr-frame)
   (setq audit-pane terminal-io)
   (make-frame)
   (send lr-frame :set-deexposed-typeout-action :permit)
   (send lr-frame :expose)
   (tv:add-select-key #/S
      'landmark-recognition-frame "LR Frame" ())
   (send audit-pane :expose))
```
FRODO:>hatem>sd3>gmodels.lisp.26

```
;;; -*- Mode: LISP; Syntax: ZETALISP; Package: USER; Base: 10; fonts : cptfont,cptfontb-*-

;;;PROGRAM: GMODELS
;;;AUTHOR: HATEM NASR
;;;DATE: 10/1/1987
;;;SYSTEM: SD2 (SCENE DYNAMICS 2)
;;;DESCRIPTION: THIS PROGRAM INSTATIATES TWO TYPES OF OBJECTS: OBJECT AND G-CYLINDER;
;;;             IT ALSO DEFINES THE PROCESS-SELF METHOD WHICH COMPUTES THE FEATURES
;;;             OF THE EXPECTED LANDMARK AND PROJECTS IT ON THE ICON-PANE
;;;PRIMARY CALLERS: ACCUMULATE-EVIDENCE-PARTS FROM >SD2>REASONING (CALLS PROCESS-SELF)
;;;
;;;RETURNS: EXPECTED OBJECT FEATURES
;;;NOTES:
```

```
;;; THIS IS A GENERIC OBJECT FLAVOR
;;; "YELLOW GATE" IS FOR EXAMPLE AN INSTANCE OF IT (defflavor object
  (name parts location plan detection recognition verification)
  ()
  :settable-instance-variables
  :initable-instance-variables)
```

```
;;; THIS A GENERIC FLAVOR FOR OBJECTS WHOSE MODELS ARE REPRESENTED
;;; AS GENERALIZED CYLINDERS (defflavor g-cylinder
    (name parts x1 y1 z1 x2 y2 z2 r color intensity ;remaining vars relate to image
          length width area per psoa lwr wlr i-length i-width r-shape
          s-color s-shape s-intensity display-lwr)
    ()
  :settable-instance-variables
  :initable-instance-variables
  :gettable-instance-variables
  )

;;; THIS METHOD IS CALLED FROM THE FUNCTION: ACCUMULATE-EVIDENCE-PARTS IN >SD2>REASONING
;;; IT COMPUTES THE 2-D PROJECTON OF THE 3-D MODEL, COMPUTES THE 2-D DIMENSIONS,
;;; PLOTS THE OBJECT AND DISPLAYS THE DIMENSIONS AND OTHER FEATURES IN THE WINDOW.
;;; IT COMPUTES THE EVIDENCE FOR THAT PART, AND RETURNS THE PART EVIDENCE: 1PE (defmethod (g-cylinder :process-self) (&aux pe)
  (let* ((p1 (list x1 y1 z1))    ;P1:ENDPOINT1; X1,Y1,Z1 ARE FROM OBJECT MODEL
         (p2 (list x2 y2 z2))    ;P2:ENDPOINT2; X2,Y2,Z2 ARE FROM OBJECT MODEL
         (xm (* (+ x1 x2) 0.5))  ;X OF THE CENTER
         (ym (* (+ y1 y2) 0.5))  ;Y OF THE CENTER
         (zm (* (+ z1 z2) 0.5))  ;Z OF THE CENTER
         (pa (list xm ym (+ zm r)))  ;PA IS OUTER POINT AT THE CENTER
         (pb (list xm ym (- zm r)))  ;PB IS THE SAME AS PA FROM OTHER DIRECTON
         (pc (list xm ym zm))    ;center point
         (i1 (project p1))       ;I1 IS (X,Y) OF THE 2-D PROJECTION
         (i2 (project p2))
         (ic (project pc))       ;projection of the center point
         )
    (setq length   (dist2d i1 i2))
    (setq i-length (// (dist2d i1 i2) 1.5))
    (setq width    (dist2d (project pa) (project pb)))
    (setq i-width  (// (dist2d (project pa) (project pb)) 1.5))
    (setq area (// (* i-length i-width) 2.0))
    ;(setq i-area (* i-length i-width))
    ;(setq lwr (if (equal name 'ygww-vertical-pole1) (// width length)
    ;              (// length width)))
    (setq lwr (cond ((or
                       (equal name 'ygww-vertical-pole1)
                       (equal name 'ygww-vertical-pole2)
                       (equal name 'ygew-vertical-pole1)
                       (equal name 'ygew-vertical-pole2)
                       (equal name 'phone-pole-1)
                       (equal name 'e-pole-1)
                       (equal name 'e-pole-2)
                       (equal name 'e-pole-3)
                       (equal name 'w-pole-1)
                       (equal name 'w-pole-2)
                       (equal name 'w-pole-3)
                       (equal name 'e-pole)
                       (equal name 'w-pole)
                       (equal name 'telephone-pole)
                       )
                     (* (// i-width i-length) 1.5))
                    (t
                     (* (// i-length i-width) 1.5))))
    (setq display-lwr (// length width))
```

```
;(setq lwr (// i-length i-width))

(setq wlr (// i-width i-length))
(setq per (+ i-length i-length i-width i-width))
(setq psoa (if (> area 0.0) (// (* per per) area) 0.0))
(send    regions-pane     :clear-window)
(send    expectation-pane :clear-window)
(format expectation-pane "~A~%" name)
;(format expectation-pane "~A~%" feat-landmark-plan)
(Format expectation-pane "length:~4F  " i-length)
(format expectation-pane "width:~4F~%" i-width)
(format expectation-pane "lw-ratio:~4F  " display-lwr)
;(format expectation-pane "wl-ratio  ~A~%" wlr)
(format expectation-pane "area:~4F~%" area)
(format expectation-pane "color:~A  " s-color)
(format expectation-pane "shape:~A~%" s-shape)

(format expectation-pane "intensity:~A  " s-intensity)
(format expectation-pane "psoa:~4F~%"psoa)
(format expectation-pane "X-cent:~4F  " (car ic))
(format expectation-pane "Y-cent:~4F" (cadr ic))
(lin i1 i2 (round width))
(format audit-pane "~A  ends: ~A ~A width: ~A~%" name i1 i2 width)
1;;;;;;;;;;;;;;;;;;;;;;;;;;;;;;;;;;;;;;;;
;for now0,1 each part is matched,
;later on parts with low intensity
;("invisible" ,shadowed, ...)
; should be ignored ! ! !
0    (cond ((check ic)
            (setq
              pe
              (part-evidence
                name ic (// length 2.0)
                (mapcar
                  #'(lambda (ms) (cons ms (send self ms)))
                  feat-landmark-plan) )))
           (t (format expectation-pane "~% OBJECT OUTSIDE FOV") (setq pe 0.3)))
1;;;;;;;;;;;;;;;;;;;;;;;;;;;;;;;;;;;;;;;;
0    (format landmarks-pane "**~A ~A" name pe)
     (push
       (cons name pe)
       object-evidence)
     (send lr-frame :any-tyi)
     pe))

(defun check (c)
  (cond ((or (< (car c) -10)
             (> (car c) 470)
             ;(< (car c) 0)
             )
         nil)
        (t t)))
FRODO:>hatem>sd3>graphics.lisp.3

;;; -*- Mode: LISP; Syntax: ZETALISP; Package: USER; Base: 10; -*-

;==========================================
;==========================================
;==========================================
;;;PROGRAM: GRAPHICS
;;;AUTHOR: HATEM NASR
;;;DATE: 10/1/1987
;;;SYSTEM: SD2 (SCENE DYNAMICS 2)
;;;DESCRIPTION: THIS PROGRAM PERFORMS SOME GRAPHICS FUNCTIONS SUCH AS HIGHLIGHTING
;;;             THE REGIONS IN THE SEGMENTED IMAGE, AND DRAWING THE ICONS OF THE
;;;             EXPECTED LANDMARKS,ALSO IT DRAWS THE GRIDS FOR DEBUGGING
;;;PRIMARY CALLERS: >SD2>G-MODELS (CALLS LIN), >SD2>MATCHING (CALLS SHOW-REGION)
;;;                 >SD2>SCENARIO
```

```
;;;RETURNS: GRAPHICS DISPLAY IN ICON AND IMAGE PANES
;;;NOTES:
;===========================================================
;===========================================================
;===========================================================

;===========================================================
;===========================================================
;===========================================================
;;; Function: LIN
;;; Arguments: P1: (X1,Y1) OF FIRST POINT, P2: (X2,Y2) OF SECOND POINT,
;;;            WIDTH: WIDTH OF LINE
;;;
;;; Description: THIS FUNCTION DRAWS A LINE BETWEEN P1 AND P2 OF A GIVEN WIDTH
;;;
;;;
;;; Callers: PROCESS-SELF IN  >SD2>G-MODELS
;;; Calls: NONE
;;; Returns: CURVES IN ICON-PANE
;===========================================================

(defvar xarr (make-array 2))
(defvar yarr (make-array 2))

(defun lin (p1 p2 width)
   (setf (aref xarr 0) (+ (round (car  p1)) x-pixel-offset))
   (setf (aref xarr 1) (+ (round (car  p2)) x-pixel-offset))
   (setf (aref yarr 0) (round (cadr p1)))
   (setf (aref yarr 1) (round (cadr p2)))
   (send icon-pane :draw-wide-curve
      xarr yarr width 2 tv:alu-ior))

;===========================================================
;===========================================================
;===========================================================
;;; Function: SHOW-REGION
;;; Arguments: R: REGION-LABEL
;;;
;;;
;;; Descrition: THIS FUNCTION DRAWS THE MIN BOUNDING RECTANGLE OF A REGION
;;;             IN THE IMAGE-PANE
;;;
;;; Callers: ACCUMULATE-PART-EVIDENCE AND PART-EVIDENCE (IN >SD2>MATCHING)
;;; Calls: NONE
;;; Returns: RECTANGLES IN IMAGE-PANE
;===========================================================

(defun show-region (r)
   (let ((bx (round (aref *l-o-regions* r xmin_indx)))
         (by (round (aref *l-o-regions* r ymin_indx)))
         (ex (round (aref *l-o-regions* r xmax_indx)))
         (ey (round (aref *l-o-regions* r ymax_indx))))
     (send image-pane :draw-lines tv:alu-xor
        bx by  bx ey  ex ey  ex by  bx by) ))

;;;SHOW-KEEP-REGION IS THE SAME AS SHOW-REGION EXCEPT FOR THE ALU FUNCTION (defun show-keep-region (r)
   (let ((bx (round (aref *l-o-regions* r xmin_indx)))
         (by (round (aref *l-o-regions* r ymin_indx)))
         (ex (round (aref *l-o-regions* r xmax_indx)))
         (ey (round (aref *l-o-regions* r ymax_indx))))
     (send image-pane :draw-lines tv:alu-ior
        bx by  bx ey  ex ey  ex by  bx by) ))

;;;SHOW-REGIONS DISPLAYS ALL THE REGIONS, IT IS A DEBUGGING FUNCTION
```

```
(defun show-regions ()
  (prog ((i 0))
    LOOP
    (when (= i n-regions)
      (return nil))
    (show-region i)

(setq i (1+ i))
    (go LOOP)))

;;; SHOWE-REGION IS ALSO A DEBUGGING FUNCTION (defun showe-region (r)
  (let ((bx (round (aref *l-o-regions* r xmin_indx)))
        (by (round (aref *l-o-regions* r ymin_indx)))
        (ex (round (aref *l-o-regions* r xmax_indx)))
        (ey (round (aref *l-o-regions* r ymax_indx))))
    (send icon-pane :draw-lines tv:alu-xor
       bx by  bx ey  ex ey  ex by  bx by) ))

(defun showe-regions ()
  (prog ((i 0))
    LOOP
    (when (= i n-regions)
      (return nil))
    (showe-region i)
    (setq i (1+ i))
    (go LOOP)))

;;; SHOW-GRID AND SHOW-GRID-IN ARE DEBUGGING FUNCTIONS ACTIVATED
;;; WHEN THE SYSTEM IS IN DEBUG MODE
(defun show-grid ()
  (show-grid-in icon-pane)
  (show-grid-in image-pane))

(defun show-grid-in (pane)
   (send pane :draw-line    0    0 500    0 tv:alu-xor)
   (send pane :draw-line    0   20 500   20 tv:alu-xor)
   (send pane :draw-line    0   40 500   40 tv:alu-xor)
   (send pane :draw-line    0   60 500   60 tv:alu-xor)
   (send pane :draw-line    0   80 500   80 tv:alu-xor)
   (send pane :draw-line    0  100 500  100 tv:alu-xor)
   (send pane :draw-line    0  120 500  120 tv:alu-xor)
   (send pane :draw-line    0  140 500  140 tv:alu-xor)
   (send pane :draw-line    0  160 500  160 tv:alu-xor)
   (send pane :draw-line    0  180 500  180 tv:alu-xor)
   (send pane :draw-line    0  200 500  200 tv:alu-xor)
   (send pane :draw-line    0  220 500  220 tv:alu-xor)
   (send pane :draw-line    0  240 500  240 tv:alu-xor)
   (send pane :draw-line    0  260 500  260 tv:alu-xor)
   (send pane :draw-line    0  280 500  280 tv:alu-xor)
   (send pane :draw-line    0  300 500  300 tv:alu-xor)
   (send pane :draw-line    0  320 500  320 tv:alu-xor)
   (send pane :draw-line    0  340 500  340 tv:alu-xor)
   (send pane :draw-line    0  360 500  360 tv:alu-xor)
   (send pane :draw-line    0  380 500  380 tv:alu-xor)
   (send pane :draw-line    0  400 500  400 tv:alu-xor)
   (send pane :draw-line    0  420 500  420 tv:alu-xor)
   (send pane :draw-line    0  440 500  440 tv:alu-xor)
   (send pane :draw-line    0  460 500  460 tv:alu-xor)
   (send pane :draw-line    0  480 500  480 tv:alu-xor)
   (send pane :draw-line    0  500 500  500 tv:alu-xor)

(send pane :draw-line    0    0   0  500 tv:alu-xor)
   (send pane :draw-line   20    0  20  500 tv:alu-xor)
   (send pane :draw-line   40    0  40  500 tv:alu-xor)
   (send pane :draw-line   60    0  60  500 tv:alu-xor)
   (send pane :draw-line   80    0  80  500 tv:alu-xor)
   (send pane :draw-line  100    0 100  500 tv:alu-xor)
   (send pane :draw-line  120    0 120  500 tv:alu-xor)
```

```
(send pane :draw-line    140 0 140 500 tv:alu-xor)
(send pane :draw-line    160 0 160 500 tv:alu-xor)
(send pane :draw-line    180 0 180 500 tv:alu-xor)
(send pane :draw-line    200 0 200 500 tv:alu-xor)
(send pane :draw-line    220 0 220 500 tv:alu-xor)
(send pane :draw-line    240 0 240 500 tv:alu-xor)
(send pane :draw-line    260 0 260 500 tv:alu-xor)
(send pane :draw-line    280 0 280 500 tv:alu-xor)
(send pane :draw-line    300 0 300 500 tv:alu-xor)
(send pane :draw-line    320 0 320 500 tv:alu-xor)
(send pane :draw-line    340 0 340 500 tv:alu-xor)
(send pane :draw-line    360 0 360 500 tv:alu-xor)
(send pane :draw-line    380 0 380 500 tv:alu-xor)
(send pane :draw-line    400 0 400 500 tv:alu-xor)
(send pane :draw-line    420 0 420 500 tv:alu-xor)
(send pane :draw-line    440 0 440 500 tv:alu-xor)
(send pane :draw-line    460 0 460 500 tv:alu-xor)
(send pane :draw-line    480 0 480 500 tv:alu-xor)
(send pane :draw-line    500 0 500 500 tv:alu-xor)
```

FRODO:>hatem>sd3>projection.lisp.1

;;; -*- Mode: LISP; Syntax: ZETALISP; Package: USER; Base: 10; -*-

```
(defun project (real-point)
  (prog (sinda cosda sinta costa tgha tgva dx dy dz xp yz yp zp)
      (setq sinda (sind DA))
      (setq cosda (cosd DA))
      (setq sinta (sind TA))
      (setq costa (cosd TA))
      (setq tgha  (tand HA))
      (setq tgva  (tand VA))
      (setq dx    (- (car   real-point) x0))
      (setq dy    (- (cadr  real-point) y0))
      (setq dz    (- (caddr real-point) z0))
      (setq xp    (- (* dx cosda) (* dy sinda)))
      (setq yz    (+ (* dx sinda) (* dy cosda)))
      (setq yp    (- (* yz costa) (* dz sinta)))
      (setq zp    (+ (* yz sinta) (* dz costa)))
      (return
           (list
              (+ 256.0 (// (* 256.0 xp) (* tgha yp)))
              (- 242.0 (// (* 242.0 zp) (* tgva yp)))))
  ))

(defun dist2d (p1 p2)
  (let ((x (- (car  p1)   (car  p2)))
        (y (- (cadr p1)   (cadr p2))))
    (sqrt (+ (* x x) (* y y))) ))

(defun dist3d (p1 p2)
  (let ((x (- (car   p1)  (car  p2)))
        (y (- (cadr  p1)  (cadr p2)))
        (z (- (caddr p1)  (caddr p2))))
    (sqrt (+ (* x x) (* y y) (* z z))) ))
```

FRODO:>hatem>sd3>retrieve-image.lisp.1

;;; -*- Mode: LISP; Syntax: zetalisp; Fonts: CPTFONT,CPTFONTB; Package: au; Base: 10;
-*-

```
(defvar *frarr347689654334* nil
)

(defun lretrieve 0(file-name pane)
  (let ((arr))
```

```
    ; create the window
    ;(setq wdw (create-frame-window 0 0 512 512))
    (setq arr (create-shadow-array pane))

; retrieve the image from the indicated file-name
    (setq arr (load-shadow-array file-name))
    (copy-array-to-window pane arr))
)

;(defun lcreate-frame-window 0(label h-pos v-pos h-size v-size)

(defun lcreate-frame-window 0(h-pos v-pos h-size v-size)
    ;creates a graphics window and returns it as an object
    ;label must be a string
    (let ((wdw
        (tv:make-window
                'tv:window
                ':position (list h-pos v-pos)
                ':inside-size (list h-size v-size)
                ;':label (list ':string label)
                ':blinker-p nil
                ':save-bits t
                ':expose-p t)))
        wdw)
)

(defun lcreate-shadow-array 0(wdw)
    ;creates an array which can hold the entire window
    (multiple-value-bind (h-size v-size)
            (zl::send wdw :inside-size)
        (tv:make-sheet-bit-array wdw h-size v-size))
)

(defun lload-shadow-array0 (filename)
    (zl::load filename)
    *frarr347689654334*
)

(defun lcopy-array-to-window 0(wdw arr)
    ;copies the contents of arr to wdw
    (zl::send wdw :expose)
    (multiple-value-bind (h-size v-size)
            (zl::send wdw :inside-size)
        (zl:send wdw
            :bitblt
                tv:alu-seta
                h-size v-size arr 0 0 0 0))
)

; #|(zl::load "FRODO:>burger>DRIVE>z-windows.lisp" 'au nil)
; #L(art-load "FRODO:>burger>DRIVE>data>sequ2>trace>point1.art")

FRODO:>hatem>sd3>scenario.lisp.17

;;; -*- Mode: LISP; Syntax: ZETALISP; Package: USER; Base: 10; -*-

;===============================================================
(defvar scenario)
(setq
  scenario
  '((site-104
      (12 09 59 00)            ;time
      (393016.8 1050715.3)     ;location
      240.0                    ;direction
                               ;image files
      ()

();landmarks
      )
```

```
(site-105
  (12 10 45 00)          ;time
  (393014.8 1050712.2);location
  240.0                  ;direction
                         ;image files
  ("frodo:)dynamics)lib)fvf)wood-gate1-frame1"
   "frodo:)dynamics)lib)fvf)wood-gate1-frame2"
   "frodo:)dynamics)lib)fvf)wood-gate1-frame3"
   "frodo:)dynamics)lib)fvf)wood-gate1-frame4"
   "frodo:)dynamics)lib)fvf)wood-gate1-frame5"
  )
  (wooden-gate-1);landmarks
)

(site-106
  (12 12 48 00)          ;time
  (392967.4 1050687.7);location
  250.0                  ;direction
  (
   "frodo:)dynamics)lib)fvf)f101"
   "frodo:)dynamics)lib)fvf)f129"
   "frodo:)dynamics)lib)fvf)f139"
   "frodo:)dynamics)lib)fvf)f152"
  )
  (yellow-gate)          ;landmarks
)

(site-107
  (12 13 57 00)          ;time
  (392937.4 1050687.7);location
  250.0                  ;direction
  (
   "frodo:)dynamics)lib)fvf)wood-gate2-frame1"
   "frodo:)dynamics)lib)fvf)wood-gate2-frame2"
   "frodo:)dynamics)lib)fvf)wood-gate2-frame3"
   "frodo:)dynamics)lib)fvf)wood-gate2-frame4"
   "frodo:)dynamics)lib)fvf)wood-gate2-frame5"
  )
  (wooden-gate)
                         ;landmarks
)

;(site-107
; (12 13 57 00)          ;time
; (392937.4 1050687.7);location
; 250.0                  ;direction
; (
;  "frodo:)dynamics)lib)fvf)test1"
;  "frodo:)dynamics)lib)fvf)test2"
;  "frodo:)dynamics)lib)fvf)test3"
;  "frodo:)dynamics)lib)fvf)test4"
;  "frodo:)dynamics)lib)fvf)test5")
; (wooden-gate)
;                        ;landmarks
;)
(site-108
  (12 17 52 00)          ;time
  (392960.1 1050676.4);location
  240.0                  ;direction
  ()                     ;image files
  ()                     ;landmarks
)
(site-109
  (12 17 58 00)          ;time
  (392955.8 1050690.4);location
  10.0                   ;direction
  ()                     ;image files
  ()                     ;landmarks
```

```
(site-110
   (12 19 27 00)            ;time
   (393016.8 1050715.3);location
   250.0                    ;direction
   ("frodo:>dynamics>lib>fvf>f363"
    "frodo:>dynamics>lib>fvf>f1918"
    "frodo:>dynamics>lib>fvf>f373"

)
   (site-110-objects)
                            ;image files
                            ;landmarks
   )
(site-111
   (12 20 37)               ;time
   (393016.8 1050715.3);location
   15.0                     ;direction
   ()                       ;image files
   ()                       ;landmarks
(site-112
   (12 21 54)               ;time
   (393016.8 1050715.3);location
   80.0                     ;direction
   ()                       ;image files
   ()                       ;landmarks
   )
))
```

FRODO:>hatem>sd3>sd3.lisp.4

```
;;;-*- Mode: LISP; Syntax: Zetalisp; Package: user; Base: 10; Fonts: CPTFONT,CPTFONTB; -*-

1;;; ****************************************************************
 ;;; ****************************************************************
 ;;;++                     -..
 ;;;$$    FILE:    SD2-SYSTEM
 ;;;$$    PROJECT: SCENE DYNAMICS
 ;;;
 ;;;$$    AUTHOR:  HATEM NASR
 ;;;$$    DATE:    8/1/1987.
 ;;;
 ;;;     DESCRIPTION:
 ;;;        Holds the system loading definition for the SD2 system.
 ;;;
 ;;;     LOADING INSTRUCTIONS:
 ;;;        Type the following command into a LISP-LISTENER:
 ;;;        (MAKE-SYSTEM 'sd2)
 ;;;
 ;;; ****************************************************************
 ;;; ****************************************************************
 ;;;

0;(let ((inhibit-fdefine-warnings :just-warn))
 ;   (defpackage library
 ;               (:nicknames lib)))

(defsystem 1sd03
   (:name "1Scene Dynamics / Landmark Recognition0")
   (:package "1user0")

(:module 1fonts
0             ("1sd031:fonts;centuryschoolbook105b0") 1:package0 1fonts0)

(:module 1basics
0             ("1sd031:system;frame0"
              "1sd031:system;fvf0"
              "1sd031:system;alv0"
              "1sd031:system;projection0"
              "1sd031:system;scenario0"
              "1sd031:system;graphics0"
              ;"1sd031:system;retrieve-image0"
```

```
    ))
 (:module 1reasoning-shell
         ("1sd031:system;reasoning-shell0"
          "1sd031:system;matching0"))

(:module 1general-models
         ("1sd031:system;gmodels0"
          "1sd031:system;gmodel-road0"))

(:module 1specific-models
         ("1sd031:system0;1smodel-yellow-gate0"
          "1sd031:system0;1smodel-0wooden1-gate0"
          "1sd031:system0;1smodel-0wooden1-gate01"
          ;"1sd031:system;smodel-phone-pole-10"
          "1sd031:system;smodel-0site-107-objects"
          ;"1sd031:system;smodel-tank-1"
          0;1 "sd031:system;smodel-building-1"
          ))

(:module 1initialization
         ("1sd031:system;initialization0"))

(:fasload 1fonts0)
 (:compile-load 1basics
         1 0(:fasload 1fonts0))
 (:compile-load 1reasoning-shell
         1 0(:fasload 1fonts basics0))
 (:compile-load 1gen0e1ra1-models
         1 0(:fasload 1fonts basics reasoning-shell0))
 (:compile-load 1specific-models
         1 0(:fasload 1fonts basics reasoning-shell gen0e1ra1-models0))
 (:readfile    1initialization
         1 0(:fasload 1fonts basics reasoning-shell gen0e1ra1-models specific-models0
 ))
 )
FRODO:>hatem>sd3>matching.lisp.17

;;; -*- Mode: LISP; Syntax: ZETALISP; Package: USER; Base: 10; fonts: cptfont,cptfontb -*-

;===============================================================================
;===============================================================================
;===============================================================================
;;;PROGRAM: MATCHING
;;;SYSTEM: SD2 (SCENE DYNAMICS 2)
;;;DESCRITION: THIS PROGRAM PERFORMS MATCHING BETWEEN THE MODEL OF A PREDICTED
;;;            LANDMARK AND THE IMAGE DATA
;;;
;;;PRIMARY CALLERS: >SD2>G-MODELS, FUNCTION/METHOD: PROCESS-SELF
;;;RETURNS: MAXIMUM EDIDENCE FOR A LANDMARK OR PART
;;;NOTES: THIS ALGORITHM NEEDS TO BE REVISED IN THE FUTURE
;===============================================================================
;===============================================================================
;===============================================================================

;===============================================================================
(defvar e-array (make-array '(550 15)))

;===============================================================================
(defun show-foa (b1 b2 e1 e2)
  (setq bx1 (+ (round b1) 25))
  (setq by1 (- (round b2) 25))
  (setq ex1 (+ (round e1) 25))
  (setq ey1 (- (round e2) 30))
  (send image-pane :draw-lines tv:alu-xor
        bx1 by1 bx1 ey1 ex1 ey1 ex1 by1 bx1 by1))
```

```
;;; Function: PART-EVIDENCE
;;; Arguments: NAME:PART/LANDMARK NAME,C:CENTROID(X,Y) OF EXPECTED OBJECT,
;;;            R: FOCUS OF ATTENTION(FOAA) EXPANSION FACTOR, FTS: FEATURES
;;;            USED FOR MATHCING
;;; Decrition: THIS FUNCTION FIRST FINDS THE BOUNDS OF THE FOAA, THEN FINDS THE REGIONS
;;;            INSIDE THE FOAA, THEN MATCHES EACH REGION AGINST THE GENERATED OBJECT
;;;            MODEL, THEN FINDS THE REGION WITH THE HIGHEST EVIDENCES
;;; Callers: PROCESS-SELF (FROM >SD2>G-MODELS)
;;; Calls: FIND-EVIDENCE, FIND-INDX, ACCUMULATE-PART-EVIDENCE
;;; Returns: MAXIMUM EVIDENCE (defun part-evidence (name c r fts &aux regs nr nf e a xmin xmax ymin ymax)
1; focus of attention area = sc[ale] * minimum bounding rectangle
0  ;SC IS A VARIABLE IT CAN BE CHANGED FROM A MENU
  (setq r (* sc r))
  ;FIND BOUNDS OF FOAA
  (setq xmin (- (car c) r))
  (setq xmax (+ (car c) r))

(setq ymin (- (cadr c) r))
  (setq ymax (+ (cadr c) r))
  (show-foa xmin ymin xmax ymax)
  (format audit-pane "~A ~A ~A ~A ~A~%" name xmin xmax ymin ymax)

;FINDS REGIONS INSIDE FOAA
  (setq regs (find-regions xmin xmax ymin ymax))

(setq max-evidence 0.0)
  (when regs ;WHEN THERE ARE REGIONS
    (setq nr (length regs))
    (setq nf (length fts))
    (find-evidence fts nf regs nr name)

(setq
      maximum-evidence-list ;LOOKS LIKE THIS (MAX-EVID ((REG1 EVID1)...(REGN EVIDN)))
        (accumulate-part-evidence c regs nr nf))

;SHOW-REGIONS IS USED ACTUALLY HERE TO ERASE REGIONS DISPLAYED
    ;BY ACCUMULATE-PART-EVIDENCE
    (mapc
      #'(lambda (rv)
          (show-region (car rv)))
      (cdr maximum-evidence-list))
    (setq max-evidence (car maximum-evidence-list))
  ) ; END OF WHEN (format audit-pane "part ~A evidence ~A" name max-evidence)
  ;(unless
  ;   (and (setq a (assoc ':area fts)) (< a 8)) ;8 pixels is the min accept area
  ;     ;(push (cons name e) object-evidence)
  ;   )

;RETURN MAX-EVIDENCE
  max-evidence)
```

```
;;; Function: FIND-REGIONS
;;; Arguments: XMIN, XMAX, YMIN, YMAX
;;; Decription: FINDS THE REGIONS INSIDE THE FOAA
;;;
;;; Callers: PART-EVIDENCE
;;; Calls: NONE
;;; Returns:REGS-->(3 6 18 56...)
```

```
(defun find-regions (xmin xmax ymin ymax)
  (prog (regs (i 0))
    LOOP
    (when (= i n-regions) (return regs))
    (when
      (and
        (> (aref *l-o-regions* i xmin_indx) xmin)
        (> (aref *l-o-regions* i ymin_indx) ymin)
        (< (aref *l-o-regions* i xmax_indx) xmax)
        (< (aref *l-o-regions* i ymax_indx) ymax))
      (push i regs))
    (setq i (1+ i))
    (go LOOP) ))
```

```
;;; Function: FIND-EVIDENCE
;;; Arguments: FTS: FEATURES LIST-->(COLOR LWR...), NF: # OF FEAT-->3 OR 4 ETC.
;;;            REGS: REGIONS LIST-->(3 4 56 67...), NR: # OF REGIONS-->23 OR 14 ETC.
;;;            NAME: LANDMARK OR PART NAME
;;; Description: MATCHES EACH REGION (USING FTS) IN REGS AGAINST THE LANDMARK MODEL
;;;
;;; Callers: PART-EVIDENCE
;;; Calls: FIND-INDX
;;; Returns: EVIDENCE-ARRAY: E-ARRAY-->(I'TH ROW IS FOR REGS, J'TH COLUMN IS FOR FEAURES)
```

```
(defun find-evidence (fts nf regs nr name)
  (prog (i j rg ft min max indx v s e)
        ;J NEXT FEATURE
        ;I NEXT REGION
        ;RG REGION TAG
        ;MIN MINIMUM FEATURE VALUE AMONG ALL REGIONS
        ;MAX MAX...
        ;INDX FEATURE INDX
        ;V ACTUAL FEAT VALUE
        ;S EXPECTED FEAT VALUE
        ;E EVIDENCE
    (setq j 0)
    NEXT_FEAT
    (setq ft (pop fts))
    (setq indx (find-indx (car ft) name))
    (setq min (aref *l-o-regions* (car regs) indx))
    (setq max (aref *l-o-regions* (car regs) indx))
    (setq i 0)

;THE FOLLOWING MINMAX LOOP IS NOT USED NOW
    MINMAX ; FIND MIN & MAX VALUE OF FEATURE FT AMONG REGIONS REGS
    (setq rg (nth i regs))
    (setq v (aref *l-o-regions* rg indx))
    (when (> v max) (setq max v))
    (when (< v min) (setq min v))
    (setq i (1+ i))

(when (< i nr)
      (go MINMAX))
    ;END OF MINMAX LOOP (setq s (cdr ft)) ;EXPECTED FEATURE VALUE
    (setq i 0)
    SIMILAR ; FIND SIMILARITY MEASURE
    (setq rg (nth i regs))
    (setq v (aref *l-o-regions* rg indx));ACTUAL FEATURE VALUE
    (setq e
          (cond
```

```
                      (((<= (abs (- s v)) (* .1 s))    1.0)
                      (((<= (abs (- s v)) (* .2 s))    0.85)
                      (((<= (abs (- s v)) (* .3 s))    0.5)
                      (((<= (abs (- s v)) (* .5 s))    0.3)
                      (t                     0.2 )))
            (setf (aref e-array i j) e)

;****DEBUG TOOLS****
       (format audit-pane "region ~A feature ~A similarity ~A   ~A ~A~%"
               (round (aref *l-o-regions* rg 0)) (car ft) e (cdr ft) v)

(setq i (1+ i))
       (when (< i nr)
         (go SIMILAR))

(setq j (1+ j))
       (when (< j nf)
         (go NEXT_FEAT))))

;===============================================================================

;===============================================================================
;===============================================================================
;===============================================================================
;;; Function: FIND-INDX
;;; Arguments: FT: FEATURE, NAME: LANDMARK/PART NAME
;;; Description: IT FINDS THE VALUE OF A REGION FEATURE BASED ON THE FEATURE'S INDEX
;;;              DEFINED IN THE >SD2>FVF FILE
;;;
;;; Callers: FIND-EVIDENCE
;;; Calls:NONE
;;; Returns: A FEATURE VALUE
;===============================================================================
(defun find-indx (ft name)
  (selectq ft
    (:color    hue_indx       )
    (:intensity mean_indx     )
    (:area     area_indx      )
    (:width    widthmax_indx  )
    (:i-length
     (if (or
                     (equal name 'ygww-vertical-pole1)
                     (equal name 'ygww-vertical-pole2)
                     (equal name 'ygew-vertical-pole1)
                     (equal name 'ygew-vertical-pole2)

(equal name 'phone-pole-1)
                     (equal name 'e-pole-1)
                     (equal name 'e-pole-2)
                     (equal name 'e-pole-3)
                     (equal name 'w-pole-1)
                     (equal name 'w-pole-2)
                     (equal name 'w-pole-3)
                     (equal name 'e-pole)
                     (equal name 'w-pole)
                     (equal name 'telephone-pole)
                     )
         widthmax_indx lengthmax_indx))
    (:length   lengthmax_indx)
    ;(:i-length (fixr (sqrt (+ (expt lengthmax_indx 2)
    ;                          (expt widthmax_indx 2)))))

(:per      perimeter_indx  )
    (:psoa     per2divarea_indx)
    (:lwr      lwratio_indx)
    (:wlr      (// 1 lwratio_indx))
    (:r-shape  convexity_indx)
    ))

(defun i-length (a b)
  (sqrt (+ (* a a)
           (* b b))))
```

```
;;; Function: ACCUMULATE-PART-EVIDENCE
;;; Arguments:CENTER:CENTROID OF MODEL, REGS: REGIONS LIST IN FOAA, NR:# OF REGS
;;;           NF: # OF FTS
;;; Description: IT FINDS THE AVERAGE SIMILARITY BETWEEN EACH REGION IN REGS, THEN
;;;              FINDS THE MAXIMUM VALUE
;;; Callers: PART-EVIDENCE
;;; Calls: SHOW-REGION
;;; Returns: MAX-EVIDENCE-LIST (defun accumulate-part-evidence (center regs nr nf)
  (prog (r j n v s rg l d max-evid max-rg max-evidence-list)
        ;r region
        ;j feature
        ;n # of regs
        ;v actual average feature value
        ;s sum for all regions
        ;RG REGION LABEL
        ;L -->((RG1 EVID1)...(RGN EVIDN))
        ;d distance between actual and expected location
        ;max-evid max evid among all regs
        ;max-rg label of region with max evid
        ;max-eviddence-list-->(max-evid ((rg1 evid1)....(rgn evidn)))
    (setq r 0)
    (setq n 0)
    (setq s 0.0)
    (setq max-evid 0.0)

NEXT-R ;NEXT REGION
        (setq j 0)
        (setq v 0.0)
        ;(setq max-evid 0.0)

NEXT-J ;NEXT FEATURE
        (setq v (+ v (aref e-array r j)))
        (setq j (1+ j))
        (when (< j nf) (go next-j)) ;END OF NEXT-J (setq v (// v (float nf))) ;AVERAGE MATCH FOR A REGION
        (setq rg (nth r regs))  ;GET LABEL OF R'TH REGION
        ;****SOME DEBUGGING TOOLS****
        (format audit-pane "region ~A value ~A ~%"
                (round (aref *l-o-regions* rg 0)) v)
        ;(format audit-pane "region ~A distance ~A ~%"
        ;       (round (aref *l-o-regions* rg 0)) d)

;IF THE AVERAGE MATCH FOR A REGION > 0.2
        (when (> v 0.2)
            (setq d
                (dist2d  ;distance of actual from expected center
                    center ;expected center (x y)
                    (list (aref *l-o-regions* rg xmax_indx) ;actual center x-coordinate
                          (aref *l-o-regions* rg ymax_indx))))
            (format audit-pane "region ~A distance ~A ~%"
                (round (aref *l-o-regions* rg 0)) d)

(setq v (// v (+ 1 (* 0.01 (sqrt d)))));make similarity depend on distance
        (setq v (* v 1.2)) ;INCREMENT EVIDENCE BY 20%
        (setq v (if (>= v 1.0) 1.0 v)) ;MAKE SURE IT IS NOT GREATER THAN 1
        (setq n (1+ n))
        (show-region rg) ;DISPLAY THE REGION ON TOP OF THE ACTUAL IMAGE
        (setq rgl (nth r regs)); GET THE REGION LABEL NUMBER
        (push (cons rg v) l);-->((RG1.EVID1)...(RGN.EVIDN))
        (setq rg (round (aref *l-o-regions* rg 0)));GET REGION LABEL FROM FEATURE FILE
```

```lisp
            (format regions-pane "~%region ~A confidence ~A" rg v)
            (setq s (+ s v))
            ;FIND THE MAX EVIDENCE
            (when
                (> v max-evid) ;IF CURRENT EVID > MAX-EVID THEN
                (setq max-evid v) ; REPLACE MAX-EVID BY CURRENT EVID
                (setq max-rg rg) ;
                (setq max-rg1 (nth r regs));
                (send image-pane :draw-string
                    (format nil "<===~A" (round (aref *l-o-regions* max-rg1 0)) )
                (round (aref *l-o-regions* rg1 4))
                (round (aref *l-o-regions* rg1 5)))
                (show-region max-rg1)
                ) ;END OF SECOND WHEN

) ;END OF FIRST WHEN (setq r (1+ r))
        (when (< r nr) (go next-r))

;(setq s
        ; (if (> n 0)
        ;     (// s (float n))
        ;     0.0))

;*SOME DEBUG TOOLS*
        (format audit-pane "max evidence region ~A ~%" max-rg)
        (format regions-pane "~%**max-evid-region ~A **" max-rg)
        (format landmarks-pane "~%*REG ~A" max-rg)
        ;(setq max-rg (round (aref *l-o-regions* max-rg 0)))
        (process-sleep 60)
        (setq max-evidence-list (cons max-evid l))
        (return max-evidence-list)
        ))
```

FRODO:>hatem>sd3>smodel-building-1.lisp.1

```lisp
;;; -*- Mode: LISP; Syntax: ZETALISP; Package: USER; Base: 10; -*-

(defvar gc3
    (make-instance 'g-cylinder
        :name    'building-1
        :x1      20.0
        :y1      100.0
        :z1      2.0
        :x2      25.0
        :y2      100.0
        :z2      2.0
        :r       2.0
        :color   0.0
        :parts   nil))

(defvar building-1
    (make-instance 'object
        :name         'building-1
        :parts        (list gc3)
        :location     '(20.0 100 0.0)
        :plan         '((70 30 detection) (30 10 recognition) (10 6 verification))
        :detection    '(:length)
        :recognition  '(:length :width)
        :verification '(:length :width)))
```

FRODO:>hatem>sd3>smodel-phone-pole-1.lisp.8

```lisp
;;; -*- Mode: LISP; Syntax: ZETALISP; Package: USER; Base: 10; -*-

;===============================================================
(defvar gc1
  (make-instance 'g-cylinder
    :name 'phone-pole-1
    :x1      -6.0
    :y1    1990.0
    :z1       0.0
    :x2      -6.0
    :y2    1990.0
    :z2       3.0
    :r        0.10
    :color    0.0
    :intensity 50.0
    :parts    nil))

(defvar phone-pole-1
  (make-instance 'object
    :name       'phone-pole-1
    :parts      (list gc1)
    :location   '(-6.0 1990 0.0)
    :plan       '((40 10 detection) (10 7 recognition) (7 4 verification))
    :detection    '(:length :width :intensity )
    :recognition  '(:length :width :intensity )
    :verification '(:length :width :intensity :color)))
```

FRODO:>hatem>sd3>smodel-site-107-objects.lisp.29

```lisp
;;; -*- Mode: LISP; Syntax: ZETALISP; Package: USER; Base: 10; -*-

;===============================================================
(defvar gc2
  (make-instance 'g-cylinder
    :name 'tank-1
    :x1       6.0
    :y1    2015.0
    :z1       0.75
    :x2       9.0
    :y2    2015.5
    :z2       0.75
    :r        0.5
    :color    0.0
    :s-color 'white
    :intensity 230.0
    :s-intensity 'high
    :r-shape  8
    :s-shape 'rectangular
    :parts    nil))

(defvar gc1
  (make-instance 'g-cylinder
    :name 'phone-pole-1
    :x1      -6.5
    :y1    2015.0
    :z1       0.0
    :x2      -6.5
    :y2    2015.0
    :z2       7.0
    :r        0.085
    :color    0.0
    :s-color 'black
    :intensity 30.0
    :s-intensity 'low
    :r-shape  100
    :s-shape 'elongated
    :parts    nil))
```

```lisp
(defvar site-110-objects
  (make-instance 'object
       :name         'site-110-objects
       :parts        (list gc2 gc1)
       :location     '(6.0 2015.0 0.0)
       :plan         '((30 20.5 detection) (20.5 10 recognition) (7 4 verification))
       :detection    '(:intensity)
       :recognition  '(:area :lwr :intensity)
       :verification '(:r-shape :area :lwr :intensity)))
```

;;; -*- Mode: LISP; Syntax: ZETALISP; Package: USER; Base: 10; -*-

```lisp
(defvar gc2
  (make-instance 'g-cylinder
     :name 'tank-1
     :x1   6.0
     :y1   1990.0
     :z1   2.0
     :x2   8.0
     :y2   1989.0
     :z2   2.0
     :r    0.4
     :color 0.0
     :intensity 230.0
     :parts nil))

(defvar tank-1
  (make-instance 'object
       :name         'tank-1
       :parts        (list gc2)
       :location     '(6.0 1990 2.0)
       :plan         '((40 10 detection) (10 7 recognition) (7 4 verification))
       :detection    '(:length :intensity :color)
       :recognition  '(:length :intensity :color)
       :verification '(:length :width :intensity :color)))
```

;;; -*- Mode: LISP; Syntax: ZETALISP; Package: USER; Base: 10; Fonts : cptfont,cptfontb-*-

```lisp
(defvar current)
(defvar image-file)
(defvar current-site)
(defvar current-time)
(defvar current-images)
(defvar current-location)
(defvar current-direction)
(defvar current-landmarks)
(defvar expectation-list)
(defvar object-evidence)
(defvar site-evidence)
(defvar reasoning-task)
(defvar task-success)
(defvar landmark-plan)
(defvar feat-landmark-plan)
(defvar flag)
(defvar site-location)
(defvar previous-time)
(defvar debug-mode)
(defvar site-uncertainty 0.0)
(defvar prev-site-uncertainty 0.0)
(defvar current-pos 0.0)
(defvar traveled-dist)
(defvar pcr)
;task types
(defvar fns '|MOVE TO NEXT SITE|)
(defvar ani '|MOVE TO NEXT IMAGE|)
(defvar exi '|TOUR COMPLETED|)
```

```
;;; Function: DESCRIBE-SITE
;;; Arguments: none
;;; Description: It displays time, location and direction of the ALV
;;;              this info is obtained from the >SD3>SCENARIO
;;;
;;; Callers: LR-INIT
;;; Calls: none (defun describe-site ()
  (format site-pane "time:     ~A:~A:~A:~A~%"
       (car current-time) (cadr current-time)
       (caddr current-time) (cadddr current-time)) .
  (format site-pane "location:  ~A ~A~%"
       (car current-location) (cadr current-location))
  (format site-pane "direction: ~A~%"
       current-direction) )

;;; Function: LR-INIT
;;; Arguments: none
;;; Description: It inializes the windows , loads the SCENARIO file, pops all
;;;              the info associated with the current map site and upcoming site
;;; Callers: LR
;;; Calls: DESCRIBE-SITE (defun lr-init ()
     (setq history nil)
     (load "FRODO:>hatem>SD3>SCENARIO.bin")
     (send site-pane         :clear-window)
     (send icon-pane         :clear-window)
     (send image-pane        :clear-window)
     (send bottom-pane       :clear-window)
     (send regions-pane      :clear-window)
     (send landmarks-pane    :clear-window)
     (send expectation-pane  :clear-window)
     (setq current            (pop scenario))
     (setq current-site       (pop current))
     (setq current-time       (pop current))
     (setq current-location   (pop current))
     (setq current-direction  (pop current))
     (setq current-images     (pop current))
     (setq current-landmarks  (pop current))
     (setq reasoning-task    fns)
     (send
       site-title-pane
         :set-label
         (list ':string (format nil "BEGIN AT ~A" current-site)
               ':font   'label-font))
     (describe-site)
     (format bottom-pane "~A~%" reasoning-task))

;;; Function: LR
;;; Arguments: none
;;; Description: This is he TOP-LEVEL function
;;;
;;; Callers: NONE
;;; Calls: LR-INIT, COMMAND-PROCESS
;;; Returns: nil
```

```
(defun lr () ;shell for command processor
  (setq prev-site-uncertainty 0.0)
  (setq current-pos 0.0)
  (setq debug-mode nil)
  (setq ex t)
  (lr-init)
  (send lr-frame :expose)
  (command-process)
  (send lr-frame :bury))
```

;===============================================================

;===============================================================
;===============================================================
;;; Function: DB
;;; Arguments: none
;;; Description: This is also a TOP-LEVEL function if the system is being
;;;              run in a DEBUG mode, it outputs results to: "frodo:>gluch>debug.lisp"
;;; Callers: NONE
;;; Calls: LR-INIT, COMMAND-PROCESS
;;; Returns: nil
;===============================================================

```
(defun db () ;shell for command processor
  (setq debug-mode t)
  (setq ex nil)
  (with-open-file
      (audit-pane "frodo:>hatem>debug.lisp.newest"
                  ':direction          ':output
                  ':if-exists           ':new-version
                  ':if-does-not-exist  ':create)
    (format audit-pane
       ";;; -*- Mode: LISP; Syntax: ZETALISP; Package: USER; Base: 10;-*-~%~%")
    (lr-init)
    (send lr-frame :expose)
    (command-process)
    (send lr-frame :bury)))
```

;===============================================================

;===============================================================
;===============================================================
;;; Function: COMMAND-PROCESS
;;; Arguments: none
;;; Description: This function executes commands associated with the "command menu
;;;              in the window
;;; Callers: LR, DB
;;; Calls: AQUIRE-DIRECTIVE, ALV-STATUS, LR-INIT, REASONING-STEP, RUN-LOOP
;;; Returns: nil
;===============================================================

```
(defun Command-Process () ;main routine
  (prog ()
    CYCLE
    (selectq
        (ACQUIRE-DIRECTIVE)
      (:alv     (alv-status))
      (:restart (lr-init))
      (:step    (when
                    scenario
                    (reasoning-step)))
      (:run     (when
                    scenario
                    (run-loop)))
      (:exit    (go EXIT)) )
    (go CYCLE)
    EXIT t ))
```

```
;;; Function: RUN-LOOP
;;; Arguments: none
;;; Description: It acquires next site info in SCENARIO until it is empty
;;;
;;; Callers: COMMAND-PROCESS
;;; Calls: REASONING-STEP
;;; Returns: nil (defun run-loop ()
  (loop
    until (null scenario)
      do (reasoning-step) ))

;;; Function: REASONING-STEP
;;; Arguments: NONE
;;; Description: IT CHECKS WHAT IS THE "REASONING-TASK" (4 STATES) AND
;;;              CHOOSES THE PROPER ACTION
;;; Callers: RUN-LOOP
;;; Calls: DETECTION, RECOGNITION, VERIFICATION, MOVE-TO-NEXT-SITE
;;; Returns: NIL (defun reasoning-step ()
  (selectq reasoning-task
    (|MOVE TO NEXT SITE|  (move-to-next-site ))
    (detection            (detection    ))
    (recognition          (recognition  ))
    (verification         (verification))
    (|TOUR COMPLETED|     nil)))

;;; Function: MOVE-TO-NEXT-SITE
;;; Arguments: NONE
;;; Description: THIS FUNCTION IS CALLED WHEN THERE IS ADDITIONAL DATA IN THE
;;;              "SCENARIO" AND THERE ARE NOT ANYMORE IMAGES AVAILABLE FOR A SITE
;;; Callers: REASONING-STEP
;;; Calls: LOAD-EXPECTED-SITE-DATA
;;; Returns: "REASONING-TASK" VALUES (defun move-to-next-site ()
  (send bottom-pane      :clear-window)
  (send regions-pane     :clear-window)
  (send expectation-pane :clear-window)
  (send landmarks-title-pane :set-label
        (list ':string "EXPECTED LANDMARKS"
              ':font   label-font))
  (cond
    (scenario
      (load-expected-site-data)
      (cond
        (current-landmarks
          (mapc
            #'(lambda (lm) (format landmarks-pane "~A" lm))
            current-landmarks)
```

```
            (setq reasoning-task 'detection))
       (current-images
          (format bottom-pane "no landmarks~%"))))
  (t
      (setq reasoning-task exi)) )
 (format bottom-pane "~A~%" reasoning-task))
```

;==================================================================

;==================================================================
;;; Function: LOAD-EXPECTED-SITE-DATA
;;; Arguments: NONE
;;; Description: LOADS THE DATA ASSOCIATED WITH THE NEXT SITE WHICH ARE OBTAINED
;;;              FROM ">SD2>SCENARIO"
;;; Callers: MOVE-TO-NEXT-SITE
;;; Calls: DESCRIBE-SITE
;;; Returns: NIL
;==================================================================

```
(defun load-expected-site-data ()
  (setq previous-time    current-time)
  (setq current          (pop scenario))
  (setq current-site     (pop current))
  (setq current-time     (pop current))
  (setq current-location (pop current))
  (setq current-direction (pop current))
  (setq current-images   (pop current))
  (setq current-landmarks (pop current))
  (setq site-location    current-location)
  (send site-pane :clear-window)
  (send
    site-title-pane
      :set-label
        (list ':string (format nil "EXPECTED ~A" current-site)
              ':font   'label-font))
  (describe-site)
  (send   landmarks-pane :clear-window))
```

;==================================================================

;==================================================================
;;; Function: MOVE-TO-NEXT-IMAGE
;;; Arguments: NONE
;;; Description: LOADS NEXT AVAILABLE IMAGE DATA WHICH INCLUDES THE SEGMENTED
;;;              IMAGE AND THE FEATURE FILE
;;; Callers: DETECTION, RECOGNITION, VERIFICATION
;;; Calls: DESCRIBE-SITE, SHOW-GRID (WHEN IN "DB" MODE)
;;; Returns: NIL
;==================================================================

```
(defun move-to-next-image ()
  (send site-pane :clear-window)
  (send image-pane :clear-window)
  (send bottom-pane :clear-window)
  (send regions-pane :clear-window)
  (send landmarks-pane :clear-window)
  (send expectation-pane :clear-window)
  (load (pop current-images))
  (describe-site)
  (when debug-mode (show-grid))
  (setq site-evidence nil)1;note - no evidence accumulation over sequence of frames !!!
0 (setq task-success  nil)
  (format bottom-pane "~A~%" reasoning-task)
  (format audit-pane "~A~%" edge-file)
  (send lr-frame :any-tyi) )
```

```
;;; Function: DETECTION
;;; Arguments: NONE
;;; Description: DEPENDING ON THE DISTANCE BETWEEN THE ALV THE CENTER POINT OF
;;;              OF A SITE THIS FUNCTION IS CALLED, ACTUAL PROCESSING OF IMAGES STARTS HERE
;;; Callers: REASONING-STEP
;;; Calls: ACCUMULATE-EVIDENCE (IN MAPC), ASSESS-SITE-EVIDENCE ;;; Returns:NIL (defun detection ()
  (cond
    (current-images
        (move-to-next-image)
        (setq flag 'detect)
        (mapc #'accumulate-evidence current-landmarks)
        (assess-site-evidence 'detection)
        (format bottom-pane "~%SITE UNCERT. ~2F" prev-site-uncertainty)
        ;(when task-success
        ;  (setq reasoning-task 'recognition))
        )
    (t (format bottom-pane "can't be done~%")
       (format bottom-pane "no images~%")
       (setq reasoning-task fns)
       (format bottom-pane "~A~%" reasoning-task)) ))

;;; Function: RECOGNITION
;;; Arguments: NONE
;;; Description: IT ESTABLISHES A RECOGNITION PLAN
;;;
;;; Callers: REASONING-STEP
;;; Calls: ACCUMULATE-EVIDENCE, ASSESS-SITE-EVIDENCE
;;; Returns: NIL (defun recognition ()
  (cond
    (current-images
        (move-to-next-image)
        ;(setq feat-landmark-plan nil)
        (setq flag 'recognize)
        ;(format landmarks-pane "~% ~A" reasoning-task)
        (mapc #'accumulate-evidence current-landmarks)
        (assess-site-evidence 'recognition)
        (format bottom-pane "~%SITE UNCERT. ~4F" prev-site-uncertainty)
        ;(when task-success
        ;  (setq reasoning-task 'verification))
        )
    (t (format bottom-pane "can't be done~%")
       (format bottom-pane "no images~%")
       (setq reasoning-task fns)
       (format bottom-pane "~A~%" reasoning-task)) ))
```

```
;;; Function: VERIFICATION
;;; Arguments: NONE
;;; Description: IT ESTABLISHES A VERIFICATION PLAN
;;;
;;; Callers: REASONING-STEP
;;; Calls: ACCUMULATE-EVIDENCE, ASSESS-SITE-EVIDENCE
;;; Returns: NIL (defun verification ()
  (cond
    (current-images
      (move-to-next-image)
      ;(setq feat-landmark-plan nil)
      (setq flag 'verify)
      ;(format landmarks-pane "~%~A" reasoning-task)
      (mapc #'accumulate-evidence current-landmarks)
      (assess-site-evidence 'verification)
      (format bottom-pane "~%SITE UNCERT. ~4F" prev-site-uncertainty)
      ;(when task-success
      ;  (setq reasoning-task fns))
      ) ;find next site = f.n.s. ;
    (t (format bottom-pane "can't be done~%")
       (format bottom-pane "no images~%")
       (setq reasoning-task fns)
       (format bottom-pane "~A~%" reasoning-task)) ))
```

```
;;; Function:  ASSESS-SITE-EVIDENCE
;;; Arguments: TASK-NAME-->(detection or recognition or verification)
;;; Description: this function is supposed to compute the total site
;;;              evidence from individual object evidences, NOW IT USES OBJECTS-PARTS EVIDE
NCES
;;; Callers: DETECTION, RECOGNITION, VERIFICATION
;;; Calls: none (defun assess-site-evidence (task-name &aux pos-c pos-n neg-c neg-n)

1 ;at some point in future someone will have to come up with
  ; a more "meaningful" formula for computing site certainty
  ; including evidence accumulation over a sequence of frames
0 (setq pos-c 1.0) ;CUMULATIVE POSISTIVE EVIDENCES
  (setq neg-c 1.0) ;CUMUKLATIVE NEG EVIDENCES
  (setq pos-n 0)
  (setq neg-n 0)
  (send bottom-pane :clear-window)

;;THIS MAP FUNCTION COUNTS THE NUMBER OF NEGATIVE PARTS EVIDENCES (< 0.2)
;;AND THE NUMBER OF POSITIVE EVIDENCES, AND THE PRODUCTS OF EACH

;;"OBJECT-EVIDENCE --> ((PART1 EVID1) (PART2 EVID2)...(PARTN EVIDN))" IS THE ARG
(mapc
  #'(lambda (o)
      (cond
        ((= (cdr o) 0) (setq neg-c (* neg-c 1)) (setq pos-c (* pos-c 1)))

( (and (< (cdr o) 0.2) (>= (cdr o) 0))
          (setq neg-n (1+ neg-n))
          (setq neg-c (* neg-c (cdr o))))
        (t
          (setq pos-n (1+ pos-n))
          (setq pos-c (* pos-c (cdr o))))  )

)
  object-evidence) ;;END OF MAPC
```

```
;(format audit-pane " pos-c neg-c******~A ~A pos-n neg-n****~A ~A" pos-c neg-c pos-n neg-n)

(setq traveled-dist (- y0 current-pos))  ;;COMPUTES THE TRAVELED DISTANCE,Y0 IS FROM THE
                                         ;;IMAGE FILE (INITIALLY CURRENT-POS=0)

;(format audit-pane "~% Tra dist ~A " traveled-dist)
;;COMPUTE THE SITE UNCERTAINTY, THIS NEEEDS TO BE REVISED
(setq site-uncertainty
      (* (+ prev-site-uncertainty (* .001 traveled-dist))
         (// (expt 0.5 (length object-evidence))
            (* pos-c neg-c))))
;;SET PREV-SITE-UNCERTAINTY TO CURRENT ONE
(setq prev-site-uncertainty site-uncertainty)
(setq current-pos y0)
)
;; END OF FUNCTION ;(cond
;  ((= pos-c 0.0)
;   (format site-pane "~% ~A ~A" task-name 0.0))
;  ((< pos-c neg-c)
;   (format site-pane "~% ~A ~3F"
;       task-name (// neg-c (float neg-n))))
;  (t
;   (setq task-success t)
;   (setq site-evidence (// pos-c (float pos-n)))
;   ;(format bottom-pane "SITE UNCERTAINTY ~2F~%" site-uncertainty)
;   (format site-pane "~% ~A ~3F"
;       task-name site-evidence)) )
;)

;;; Function: DIST1D
;;; Arguments: P1,P2 TWO POINTS WITH X,Y,Z COORDS
;;; Description: COMPUTES THE DISTANCE BETWEEN THE TWO POINTS ALONG THE Y AXIS
;;;
;;; Callers: ACCUMULATE-EVIDENCE
;;; Calls: NONE
;;; Returns: DISTANCE BETWEEN TWO POINTS (defun dist1d (p1 p2)
  (let (
       ;(x (- (car p1)   (car p2)))
        (y (- (cadr p1)  (cadr p2)))
       ;(z (- (caddr p1) (caddr p2)))
        )
    (sqrt (* y y)) ))

;;; Function: ACCUMULATE-EVIDENCE
;;; Arguments: LANDMARK-->THE LANDMARK NAME
;;; Description: THIS FUNCTION CHECKS THE DIST BETWEEN THE ALV AND THE LANDMARK
;;;              AND BRINGS UP THE PROPER "FEATURE PLAN", THEN COLLECTS THE EVIDENCES
;;; Callers: DETECTION, RECOGNITION, VERIFICATION
;;; Calls: ACCUMULATE-EVIDENCE-PARTS, ASSESS-OBJECT-EVIDENCE
;;; Returns: SITE-EVIDENCE, OBJECT-EVIDENCE (defun accumulate-evidence (landmark &aux dist test)
  (setq landmark (eval landmark))
  (setq dist (dist1d
               (list x0 y0 z0)
               (send landmark :location)))
```

```
(setq landmark-plan (send landmark :plan))
(cond
  ((and (setq test (car landmark-plan))
        (< dist (car  test))
        (> dist (cadr test)))
        ;(equal flag 'detect))
   (setq reasoning-task 'detection)

(setq
       feat-landmark-plan
         (send landmark :detection))
     (format bottom-pane "~%~A" feat-landmark-plan))
  ((and (setq test (cadr landmark-plan))
        (< dist (car  test))
        (> dist (cadr test)))
        ;(equal flag 'recognize))
   (setq reasoning-task 'recognition)
     (setq
       feat-landmark-plan
         (send landmark :recognition))
     (format bottom-pane "~%~A" feat-landmark-plan)
   )
  ((and (setq test (caddr landmark-plan))
        (< dist (car  test))
        (> dist (cadr test)))
        ;(equal flag 'verify))
   (setq reasoning-task 'verification)
     (setq
       feat-landmark-plan
         (send landmark :verification))
     (format bottom-pane "~%~A" feat-landmark-plan)
   )
  (t
    (setq feat-landmark-plan nil)))
(when feat-landmark-plan
  (send landmarks-title-pane :set-label
    (list ':string (format nil "~A" (send landmark :name))
          ':font    label-font))
  (setq object-evidence nil)
  (format audit-pane "~%~A ~A"
    (send landmark :name)
    ;  (accumulate-evidence-parts landmark))
  (when debug-mode
    (debug-landmark landmark))
  (push
    (assess-object-evidence landmark)
      site-evidence) ))
```

;===============================================================

;===============================================================
;===============================================================
;;; Function:
;;; Arguments:
;;; Descrition:
;;;
;;; Callers:
;;; Calls:
;;; Returns:
;===============================================================

```
(defun assess-object-evidence (landmark &aux pos-c pos-n neg-c neg-n)

1 ;at some point in future someone will have to come up with
  ; a more "meaningful" formula for computing object certainty 0 (setq pos-c 0.0)
  (setq neg-c 0.0)
```

```
(setq pos-n 0)
(setq neg-n 0)
(mapc
  #'(lambda (o)
      (cond
        ((< (cdr o) 0.2)
         (setq neg-n (1+ neg-n))
         (setq neg-c (* neg-c (cdr o))))
        (t
         (setq pos-n (1+ pos-n))
         (setq pos-c (* pos-c (cdr o)))) ) )
  object-evidence)
(setq site-uncertainty
      (* (+ site-uncertainty 0.2)
         (// (expt 0.5 (+ pos-c neg-c))
             (+ pos-n neg-n))))
;(format bottom-pane "SITE UNCERTAINTY ~2F~%" site-uncertainty)
(cons
  (send landmark :name)
  site-uncertainty))

;(cons
;  (send landmark :name)
;  (cond
;    ((or (< neg-n pos-n) (< neg-c pos-c))
;     (// pos-c (float pos-n)))
;    (t
;     (// neg-c (float neg-n))) ) )
```

```
(defun accumulate-evidence-parts (object)
  (let ((parts (send object :parts)))
    (if
      parts
        (mapcan #'accumulate-evidence-parts parts)
        (send object :process-self)) ))
```

```
(defun debug-landmark (landmark)
  (prog ()
    LOOP
    (alv-status)
    (when ex (return nil))
    (show-straight-road
      (list left-road-side    4.0 0.0)
      (list left-road-side  900.0 0.0)
      (list right-road-side   4.0 0.0)
      (list right-road-side 900.0 0.0))
    (show-grid-in icon-pane)
    (accumulate-evidence-parts landmark)
    (go loop) ))
```

;;; -*- Mode: LISP; Syntax: ZETALISP; Package: USER; Base: 10; -*-

```
(defvar e-pole
  (make-instance 'g-cylinder
    :name       'e-pole
    :x1         -3.25
    :y1         50.0
    :z1         0.0
    :x2         -3.25
    :y2         50.0
    :z2         1.44
    :r          0.083339995
    :color      0.0
    :s-color    'black
    :intensity  68
    :s-intensity 'low
    :r-shape    15
    :s-shape    'elongated
    :parts nil))
```

```
(defvar e-bar
  (make-instance 'g-cylinder
    :name       'e-bar
    :x1         -5.0
    :y1         50.0
    :z1         0.0
    :x2         -3.0
    :y2         50.0
    :z2         1.0
    :r          0.0953339995
    :color      5.5
    :s-color    'black
    :intensity  68
    :s-intensity 'low
    :r-shape    15
    :s-shape    'elongated
    :parts nil))

(defvar telephone-pole
  (make-instance 'g-cylinder
    :name       'telephone-pole
    :x1         -10.5
    :y1         60.0
    :z1         0.0
    :x2         -10.5
    :y2         60.0
    :z2         5.3
    :r          0.095
    :color      5.5
    :s-color    'black
    :intensity  85
    :s-intensity 'low
    :r-shape    15
    :s-shape    'elongated
    :parts nil))

(defvar telephone-pole-top-bar
  (make-instance 'g-cylinder
    :name       'telephone-pole-top-bar
    :x1         -11.2
    :y1         60.0
    :z1         5.3
    :x2         -9.8
    :y2         60.0
    :z2         5.3
    :r          0.085
    :color      5.5
    :s-color    'black
    :intensity  120
    :s-intensity 'medium
    :r-shape    15
    :s-shape    'elongated
    :parts nil))

(defvar east-wood-gate-1
  (make-instance 'object
    :name    'east-wood-gate
    :parts   (list e-pole e-bar telephone-pole telephone-pole-top-bar) ))

(defvar w-pole
  (make-instance 'g-cylinder
    :name       'w-pole
    :x1         3.25
    :y1         50.0
    :z1         0.0
    :x2         3.25
    :y2         50.0
    :z2         1.44
    :r          0.083339995
    :color      5.5
    :s-color    'black
```

```
            :intensity 68
            :s-intensity 'low
            :r-shape 15
            :s-shape 'elongated
            :parts nil))

(defvar w-bar
  (make-instance 'g-cylinder
            :name       'w-bar
            :x1    5.0
            :y1   50.0
            :z1    0.0
            :x2    3.25
            :y2   50.0
            :z2    1.0
            :r     0.0953339995
            :color 5.5
            :s-color 'black
            :intensity 68
            :s-intensity 'low
            :r-shape 15
            :s-shape 'elongated
            :parts nil))

(defvar west-wood-gate-1
  (make-instance 'object
         :name       'west-wood-gate
         :parts      (list w-pole w-bar) ))

(defvar wooden-gate-1
  (make-instance 'object
         :name       'wooden-gate-1
         :parts      (list west-wood-gate-1 east-wood-gate-1)
         :location   '(-0.75 50 0.5)
         :plan       '((30 26 detection) (25.9 23.0 recognition) (22.9  0 verification))
         :detection    '(:intensity )
         :recognition  '(:intensity :r-shape  :lwr)
         :verification '(:intensity :r-shape :psoa :lwr);:lines
                         ) )

;;; -*- Mode: LISP; Syntax: ZETALISP; Package: USER; Base: 10; -*-

;===================================================================
(defvar ygww-vp1
  (make-instance 'g-cylinder
         :name       'ygww-vertical-pole1
         :x1    -3.25
         :y1    100.0
         :z1     0.0
         :x2    -3.25
         :y2    100.0
         :z2     1.34112
         :r      0.053339995
         :color  5.5
         :s-color 'yellow
         :intensity 50
         :s-intensity 'medium
         :r-shape 35
         :s-shape 'elongated
         :parts nil))

(defvar ygww-vp2
  (make-instance 'g-cylinder
         :name       'ygww-vertical-pole2
         :x1    -3.25
         :y1    103.0
         :z1     0.0
         :x2    -3.25
         :y2    103.0
         :z2     1.34112
```

```
        :r      0.053339995
        :color  5.5
        :s-color 'yellow
        :intensity 50
        :s-intensity 'medium
        :r-shape 35
        :s-shape 'elongated
        :parts nil))

(defvar ygww-tb
  (make-instance 'g-cylinder
        :name    'ygww-top-bar
        :x1      -3.25
        :y1      100.0
        :z1      1.1887201
        :x2      -3.25
        :y2      103.0
        :z2      1.1887201
        :r       0.053339995
        :color   5.5
        :s-color 'yellow
        :intensity 200
        :s-intensity 'high
        :r-shape 35
        :s-shape 'elongated
        :parts nil))

(defvar ygww-cb
  (make-instance 'g-cylinder
        :name    'ygww-center-bar
        :x1      -3.25
        :y1      100.0
        :z1      0.8534399
        :x2      -3.25
        :y2      103.0
        :z2      0.8534399
        :r       0.053339995
        :color   5.5
        :s-color 'yellow
        :intensity 200
        :s-intensity 'high
        :r-shape 35
        :s-shape 'elongated
        :parts nil))

(defvar y-g-west-wing
  (make-instance 'object
        :name    'yellow-gate-west-wing
        :parts   (list ygww-vp1 ygww-vp2 ygww-tb ygww-cb) ))

(defvar ygew-vp1
  (make-instance 'g-cylinder
        :name    'ygew-vertical-pole1
        :x1      3.25
        :y1      100.0
        :z1      0.0
        :x2      3.25
        :y2      100.0
        :z2      1.34112
        :r       0.053339995
        :color   5.5
        :s-color 'yellow
        :intensity 50
        :s-intensity 'medium
        :r-shape 35
        :s-shape 'elongated
        :parts nil))

(defvar ygew-vp2
  (make-instance 'g-cylinder
        :name    'ygew-vertical-pole2
        :x1      3.25
        :y1      103.25
```

```
        :z1      0.0
        :x2      3.25
        :y2      103.25
        :z2      1.34112
        :r       0.053339995
        :color   5.5
        :s-color 'yellow
        :intensity 50
        :s-intensity 'medium
        :r-shape 35
        :s-shape 'elongated
        :parts nil))

(defvar ygew-tb
   (make-instance 'g-cylinder
        :name       'ygew-top-bar
        :x1      3.25
        :y1      100.0
        :z1      1.1887201
        :x2      3.25
        :y2      103.25
        :z2      1.1887201
        :r       0.05
        :color   5.5
        :s-color 'yellow
        :intensity 200
        :s-intensity 'high
        :r-shape 35
        :s-shape 'elongated
        :parts nil))

(defvar ygew-cb
   (make-instance 'g-cylinder
        :name       'ygew-center-bar
        :x1      3.25
        :y1      100.0
        :z1      0.8534399
        :x2      3.25
        :y2      103.25
        :z2      0.8534399
        :r       0.053339995
        :color   5.5
        :s-color 'yellow
        :intensity 200
        :s-intensity 'high
        :r-shape 35
        :s-shape 'elongated
        :parts nil))

(defvar y-g-east-wing
   (make-instance 'object
        :name    'yellow-gate-east-wing
        :parts   (list ygew-vp1 ygew-vp2 ygew-tb ygew-cb) ))

(defvar yellow-gate
   (make-instance 'object
        :name    'yellow-gate
        :parts   (list y-g-west-wing y-g-east-wing)
        :location '(-0.75 101.5 0.5)
        :plan    '((30 20 detection) (20 10 recognition) (10 0 verification))
        :detection    '(:color :lwr)
        :recognition  '(:color :area :r-shape :i-length :lwr)
        :verification '(:color :r-shape :i-length :lwr :area);;lines
                  ) )
```

We claim:

1. A landmark recognition system or autonomous vehicle navigation, comprising:
   a camera, mounted on a vehicle, for outputting images of a field of view;
   a first processor, connected to said camera, for processing the images into an image model having segmented regions, extracted objects and features;
   a second processor, connected to said first processor, for outputting expected site models for each of the extracted objects;
   a third processor, connected to said first and second processors, comprising means for matching expected site models and features from said second processor to extracted objects and features from said first processor, means for accruing evidence of the matching, means for determining site uncertainty of the models, and means for checking consistency between approximated range and sizes of the objects resulting in updated ranges of the objects;
   a first data base, connected to said second processor, having model information, map information and camera information; and
   a second data base, connected to said second and third processors, having current map location, speed and direction of the vehicle, and an updated estimated range and azimuth of the vehicle.

2. Apparatus of claim 1 wherein said second processor comprises:
   an expected map site and objects reasoner connected to said first and second storage means; and
   dynamic expectation models generator connected to said first and third processors, to said first and second storage means, and to said expected map site and objects reasoner.

3. Apparatus of claim 2 wherein said first processor comprises:
   a low-level processing unit connected to said camera;
   a mid-level processing unit connected to said low-level processing unit;
   a blackboard, connected to said mid-level processing unit and to said third processor, for structuring information from said mid-level processor and said third processor, and for storing image information; and
   an image model unit, connected to said blackboard, and to said second and third processors, for providing a mechanism for observing the results of the system.

4. A landmark recognition process for autonomous vehicle navigation, comprising:
   sensing images from a perspective of a vehicle;
   retrieving models of landmarks;
   generating expectations about landmarks being in the images;
   matching images of landmarks with models of landmarks;
   accumulating evidence that results in a matching confidence of a relevant landmark model to a particular landmark image at a site of the vehicle;
   determining site uncertainty of landmarks located in respective region segments of a map; and
   storing site uncertainty information into a knowledge base of the map.

5. A landmark recognition system for autonomous vehicle navigation, comprising:
   sensing means for acquiring images;
   first processing means, connected to said sensing means, for processing the images;
   second processing means comprising means for computing models, means for matching models, means for mapping landmarks, means for verifying matching, means for accumulating evidence and means for determining site uncertainty; and
   interface means, connected to said first and second means, for interfacing signals between said first and second processing means.

6. A landmark recognition system for autonomous vehicle navigation, comprising:
   sensing means for acquiring images having landmarks, mounted on a vehicle;
   image processing means, connected to said sensing means, for providing features of the landmarks in the acquired images;
   retrieving means for retrieving models of landmarks;
   p1 generating means, connected to said image processing means and to said retrieving means, for generating expectations about landmarks in the images acquired by said sensing means;
   matching means, connected to said generating means and to siad sensing means, for matching images of landmarks according to the features with models of landmarks form a landmark data base;
   accumulating means, connected to said matching means and to said image processing means, for accumulating evidence that indicates a matching confidence of a relevant model of a landmark to an image of a landmark;
   determining means, connected to image processing means and to said accumulating means, for determining site uncertainty of landmarks located in respective region segments of a geographical area; and
   storing means, connected to said determining means, for storing site uncertainty information into a data base for the area.

7. A landmark recognition system for autonomous vehicle navigation, comprising:
   sensing means, attached to a vehicle, for acquiring images;
   extraction means, connected to said sensing means, for extracting objects in the images and extracting features of the objects resulting in an image model;
   generating means for generating dynamic 2-D models of objects;
   matching means, connected to said extraction means and to said generating means, for dynamic model matching of the 2-D models with the image model, thereby outputting a map location uncertainty;
   model data base connected to said generating means;
   map data base connected to said generating means;
   sensing means model connected to said generating means; and
   vehicle data base connected to said generating means.

8. A landmark recognition system for autonomous vehicle navigation, comprising:
   camera, mounted on a vehicle, for making images from a field of view of siad camera;
   extractor, connected to said camera for extracting of objects from the images and in turn for extracting features of the objects, resulting in an image model;

generator for generating dynamic 2-D models of objects;

correlator, connected to said extractor and to said generator, for dynamically matching the image model with the dynamic 2-D models, and outputting map location uncertainty of said camera;

a first data base, having models of objects, connected to said generator;

a second data base, having map information, connected to said generator;

a third data base, having parameters of siad camera, connected to said generator; and a fourth data base, having location, speed and direction of the vehicle, connected to said generator.

* * * * *

UNITED STATES PATENT AND TRADEMARK OFFICE
CERTIFICATE OF CORRECTION

PATENT NO. : 5,144,685

DATED : September 1, 1992

INVENTOR(S) : BIR BHANU ET AL.

It is certified that error appears in the above-identified patent and that said Letters Patent is hereby corrected as shown below:

Column 97, line 2, delete "or" and insert --for--

Column 98, line 23, delete "pl"

Column 98, line 28, delete "siad" and insert --said--

Column 98, line 65, delete "siad" and insert --said--

Column 100, line 3, delete "siad" and insert --said--

Signed and Sealed this

Fourteenth Day of September, 1993

Attest:

BRUCE LEHMAN

*Attesting Officer*   *Commissioner of Patents and Trademarks*